US012368612B2

(12) United States Patent
Vairavakkalai et al.

(10) Patent No.: US 12,368,612 B2
(45) Date of Patent: *Jul. 22, 2025

(54) SERVICE-BASED TRANSPORT CLASSES FOR MAPPING SERVICES TO TUNNELS

(71) Applicant: Juniper Networks, Inc., Sunnyvale, CA (US)

(72) Inventors: Kaliraj Vairavakkalai, Fremont, CA (US); Natrajan Venkataraman, Sunnyvale, CA (US); Balaji Rajagopalan, Bangalore (IN); Vasudevan Navaneetha Krishnan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,621

(22) Filed: Jan. 22, 2024

(65) Prior Publication Data

US 2024/0267257 A1    Aug. 8, 2024

Related U.S. Application Data

(63) Continuation of application No. 16/836,457, filed on Mar. 31, 2020, now Pat. No. 11,881,963.

(30) Foreign Application Priority Data

Feb. 28, 2020    (IN) .............................. 202041008536

(51) Int. Cl.
*H04L 12/46*        (2006.01)
*H04L 45/302*       (2022.01)
(Continued)

(52) U.S. Cl.
CPC ........ *H04L 12/4633* (2013.01); *H04L 45/302* (2013.01); *H04L 45/745* (2013.01);
(Continued)

(58) Field of Classification Search
None
See application file for complete search history.

(56) References Cited

U.S. PATENT DOCUMENTS 8,027,347 B2    9/2011    Ould-Brahim
8,958,286 B1    2/2015    Atlas et al.
(Continued)

FOREIGN PATENT DOCUMENTS

CN    101617305 A    12/2009
CN    101636724 A    1/2010
(Continued)

OTHER PUBLICATIONS

Bates et al., "Multiprotocol Extensions for BGP-4," Network Working Group, RFC 4760, Jan. 2007, 13 pp.
(Continued)

*Primary Examiner* — Derrick W Ferris
*Assistant Examiner* — Keith Follansbee
(74) *Attorney, Agent, or Firm* — Shumaker & Sieffert, P.A.

(57) ABSTRACT

Techniques are disclosed for disseminating network service-specific mapping information across administrative domains. In one example, a network device receives an indication of a route target and one or more underlay tunnels configured to support a service route. The service route is configured to transport network traffic associated with a first network service of a plurality of network services. The network device defines, based on the indication, a first transport class of a plurality of transport classes. The network device receives a service route for the first network
(Continued)

service and stores a correspondence between the service route and the first transport class. The network device receives network traffic associated with the first network service and forwards, based on the correspondence, the network traffic along the underlay tunnels specified by the first transport class.

20 Claims, 5 Drawing Sheets

(51) Int. Cl.
  *H04L 45/745* (2022.01)
  *H04L 47/193* (2022.01)
  *H04L 47/2408* (2022.01)
  *H04L 67/75* (2022.01)

(52) U.S. Cl.
  CPC ........ *H04L 47/193* (2013.01); *H04L 47/2408* (2013.01); *H04L 67/75* (2022.05)

(56) References Cited

U.S. PATENT DOCUMENTS

| | | | |
|---|---|---|---|
| 9,106,530 | B1 | 8/2015 | Wang |
| 9,634,936 | B2 | 4/2017 | Bansal et al. |
| 10,554,549 | B1* | 2/2020 | Basavarajappa ...... H04L 69/325 |
| 11,881,963 | B2 | 1/2024 | Vairavakkalai et al. |
| 2008/0170578 | A1 | 7/2008 | Ould-Brahim |
| 2014/0153578 | A1 | 6/2014 | Ould-Brahim |
| 2016/0057105 | A1 | 2/2016 | Kato |
| 2017/0064717 | A1* | 3/2017 | Filsfils .................... H04L 45/50 |
| 2018/0351857 | A1 | 12/2018 | Vairavakkalai et al. |
| 2018/0359323 | A1* | 12/2018 | Madden .............. H04L 12/4633 |
| 2019/0014047 | A1* | 1/2019 | Dale .................... H04L 41/0894 |
| 2020/0162282 | A1 | 5/2020 | Ashtaputre et al. |
| 2020/0177494 | A1 | 6/2020 | Franzen et al. |

FOREIGN PATENT DOCUMENTS

| | | |
|---|---|---|
| CN | 101686174 A | 3/2010 |
| CN | 105306333 A | 2/2016 |
| EP | 2963866 A2 | 1/2016 |
| WO | 2008089303 A1 | 7/2008 |

OTHER PUBLICATIONS

Berger et al., "BGP/IP VPNs: BGP and CE-Based Virtual Private Networks; draft-berger-13vpn-ip-tunnels-01.txt," IETF: Internet Draft, Oct. 24, 2007, 16 pp.
Chan et al., "Inter-Domain Traffic Steering with BGP Labeled Colored Unicast (BGP-LCU)," draft-szarecki-idr-bgp-lcu-traffic-steering-00, IDR Working Group, Jul. 7, 2019, 15 pp.
Communication pursuant to Article 97(2) from counterpart European Application No. 20179777.6 dated Apr. 26, 2023, 5 pp.
Decision of Rejection, and translation thereof, from counterpart Chinese Application No. 202010548001.5 dated Sep. 22, 2023, 14 pp.
Extended Search Report from counterpart European Application No. 20179777.6, dated Nov. 20, 2020, 11 pp.
First Office Action and Search Report, and translation thereof, from counterpart Chinese Application No. 202010548001.5 dated Aug. 3, 2022, 15 pp.
Previdi et al., "Advertising Segment Routing Policies in BGP," draft-ietf-idr-segment-routing-te-policy-08, Network Working Group, Nov. 18, 2019, 39 pp.
Rekhter et al., "A Border Gateway Protocol 4 (BGP-4)," Network Working Group, RFC 4271, Jan. 2006, 105 pp.
Response to Communication pursuant to Article 94(3) EPC dated Apr. 26, 2023, from counterpart European Application No. 20179777.6 filed Aug. 22, 2023, 16 pp.
Response to Extended Search Report dated Nov. 20, 2020, from counterpart European Application No. 20179777.6 filed Mar. 1, 2022, 26 pp.
Rosen et al., "MPLS Label Stack Encoding," Network Working Group, RFC 3032, Jan. 2001, 24 pp.
Rosen et al., BGP/MPLS IP Virtual Private Networks (VPNs), Network Working Group, RFC 4364, Feb. 2006, 48 pp.
Rosen, "Using BGP to Bind MPLS Labels to Address Prefixes," Internet Engineering Task Force (IETF), RFC 8277, Oct. 2017, 24 pp.
Second Office Action from counterpart Chinese Application No. 202010548001.5 dated Apr. 26, 2023, 14 pp.
U.S. Appl. No. 16/588,387, filed Sep. 30, 2019, Juniper Networks, Inc. (inventor: Singh), entitled "Mapping Services to Tunnels in Order to Forward Packets Using a Network Device".
U.S. Appl. No. 16/779,426, filed Jan. 31, 2020, Juniper Networks, Inc. (inventor: Singh), entitled "Service-Based Tunnel Selection Scheme for Mapping Services to Tunnels".
Vairavakkalai et al., "BGP Classful Transport Planes; draft-kaliraj-idr-bgp-classful-transport-planes-00," IETF: Internet Draft, May 8, 2020, 14 pp.
Vairavakkalai et al., "BGP Transport VPNs," draft-kaliraj-idr-bgp-transport-vpn-00, Network Working Group, Mar. 7, 2020, 13 pp.
Walton et al., "Advertisement of Multiple Paths in BGP," Internet Engineering Task Force (IETF), RFC 7911, Jul. 2016, 9 pp.
Prosecution History from U.S. Appl. No. 16/836,457, now issued U.S. Pat. No. 11,881,963, dated Apr. 2, 2021 through Dec. 14, 2023, 265 pp.
Notice of Intent to Grant and Text Intended to Grant from counterpart European Application No. 20179777.6 dated Jul. 19, 2024, 48 pp.
Extended Search Report from counterpart European Application No. 24223068.8 dated Apr. 7, 2025, 12 pp.

* cited by examiner

SERVICE-BASED TRANSPORT CLASSES FOR MAPPING SERVICES TO TUNNELS

This application is a continuation of U.S. application Ser. No. 16/836,457, filed Mar. 31, 2020, which claims the benefit of Indian Provisional No. 202041008536, filed on Feb. 28, 2020. The entire contents of each of U.S. application Ser. No. 16/836,457 and Indian Provisional No. 202041008536 are incorporated herein by reference.

TECHNICAL FIELD

The disclosure relates to computer networks.

BACKGROUND

A computer network is a collection of interconnected computing devices that exchange data and share resources. In a packet-based network the computing devices communicate data by dividing the data into small blocks called packets. Certain device within the network, such as routers and switches, maintain routing and/or forwarding information that describe paths through the network. In this way, the packets may be individually transmitted across the network from a source device to a destination device. The destination device extracts the data from the packets and assembles the data into its original form. Dividing the data into packets allows the source device to resend only those individual packets that may be lost during transmission.

Examples of computer networks include enterprise networks, branch networks, service provider networks, home networks, virtual private networks (VPNs), local area network (LANs), virtual LANs (VLANs) and the like. In any case, the computer networks may allow remotely located sources and receivers to share data. Network service providers provide services such as linking customer sites through a network core (VPN services) or subscribers to a service, security, tunneling, virtual private networks, filtering, load-balancing, VoIP/Multimedia processing and various types of application proxies (HTTP, XML, WAP, etc.) to incoming packets. Service providers also provide content-specific services designed to improve the quality of a user's experience, for example, video streaming and caching.

SUMMARY

Techniques are disclosed for disseminating network service-specific information across administrative domains. A network may implement a service route for transporting network traffic from a service host device to a customer edge device. A service route (also referred interchangeably herein as an "overlay route") may be a logical route from the service host device to the customer edge device and may cross multiple domains. Examples of service routes include, e.g., service families such as inet-uni, l3vpn, etc. The service route may be supported by one or more underlay tunnels across one or more domains. Two network devices within a domain may signal, via a routing protocol message, one or more underlay tunnels to forward network traffic across the domain. Each underlay tunnel between two devices may have different characteristics, such as bandwidth, latency, etc. The techniques for service-mapping set forth herein allow a network device to receive a routing protocol message that provides information for resolving a service route for a specific network service to one or more underlay tunnels (e.g., for "mapping" the service route to the one or more underlay tunnels) such that the network device may forward network traffic along one or more underlay tunnels in a service-specific fashion. The use of such a routing protocol message allows the network system to propagate such information across multiple administrative domains.

As described herein, a network device, such as an ingress or border device, receives an indication of a route target and one or more underlay tunnels configured to support a service route. In some examples, the network device receives the route target and the one or more underlay tunnels from another network device via a routing protocol message and/or may propagate the route target and the one or more underlay tunnels to another network device via a routing protocol message. The service route is configured to transport network traffic associated with a first network service of a plurality of different network services. The network device defines, based on the indication, a first transport class of a plurality of transport classes that comprises the route target and specifies the one or more underlay tunnels. The route target of the first transport class is different from route targets of each other transport class of the plurality of transport classes. The network device stores the first transport class of the plurality of transport classes.

Subsequently, the network device receives the service route for the first network service. As described herein, the service route is extended to specify a mapping community. The network device determines a correspondence of the mapping community of the service route to a transport Routing Information Base (RIB) of the first transport class and stores, based on the correspondence, an association between the service route and the first transport class of the plurality of transport classes. The network device receives network traffic associated with the first network service and identifies the service route for the first network service corresponding to the network traffic. Further, the network device identifies the first transport class based on the association between the service route and the first transport class. The network device forwards the network traffic for the first network service along the one or more underlay tunnels specified by the first transport class.

The techniques of the disclosure may provide specific improvements to the computer-related field of computer networking that have practical applications. For example, the techniques of the disclosure enable a network system to build multiple colored transport planes across multiple domains in a scalable fashion without extensive changes to deployed network devices. Further, the techniques of the disclosure enable scaling out, instead of scaling up, the resolver code such that a network device as described herein may exhibit improved scalability and performance attributes over other techniques for mapping service routes for a network service to underlay tunnels. The techniques of the disclosure may be easier to implement with minimal changes to the operation of existing network devices. For example, the techniques of the disclosure may enable simple, modular design and maintainability of the routing protocol process of a network device when scaling network devices of a network system while reducing regressing risk.

In one example, this disclosure describes a method comprising: receiving, by processing circuitry of a first network device, an indication of a route target and one or more underlay tunnels configured to support a service route, the service route configured to transport network traffic associated with a first network service of a plurality of network services; defining, by the processing circuitry and based on the indication, a first transport class of a plurality of transport classes, wherein the first transport class comprises the route target and specifies the one or more underlay tunnels, and wherein the route target of the first transport class is different from route targets of each other transport class of the plurality of transport classes; and storing, by the processing circuitry, the first transport class of the plurality of transport classes.

In another example, this disclosure describes a network device comprising processing circuitry, the network device configured to: receive an indication of a route target and one or more underlay tunnels configured to support a service route, the service route configured to transport network traffic associated with a first network service of a plurality of network services; define, based on the indication, a first transport class of a plurality of transport classes, wherein the first transport class comprises the route target and specifies the one or more underlay tunnels, and wherein the route target of the first transport class is different from route targets of each other transport class of the plurality of transport classes; and store the first transport class of the plurality of transport classes.

In another example, this disclosure describes a non-transitory computer-readable medium comprising instructions that, when executed, are configured to cause processing circuitry of a network device to: receive an indication of a route target and one or more underlay tunnels configured to support a service route, the service route configured to transport network traffic associated with a first network service of a plurality of network services; define, based on the indication, a first transport class of a plurality of transport classes, wherein the first transport class comprises the route target and specifies the one or more underlay tunnels, and wherein the route target of the first transport class is different from route targets of each other transport class of the plurality of transport classes; and store, in a storage medium, the first transport class of the plurality of transport classes.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
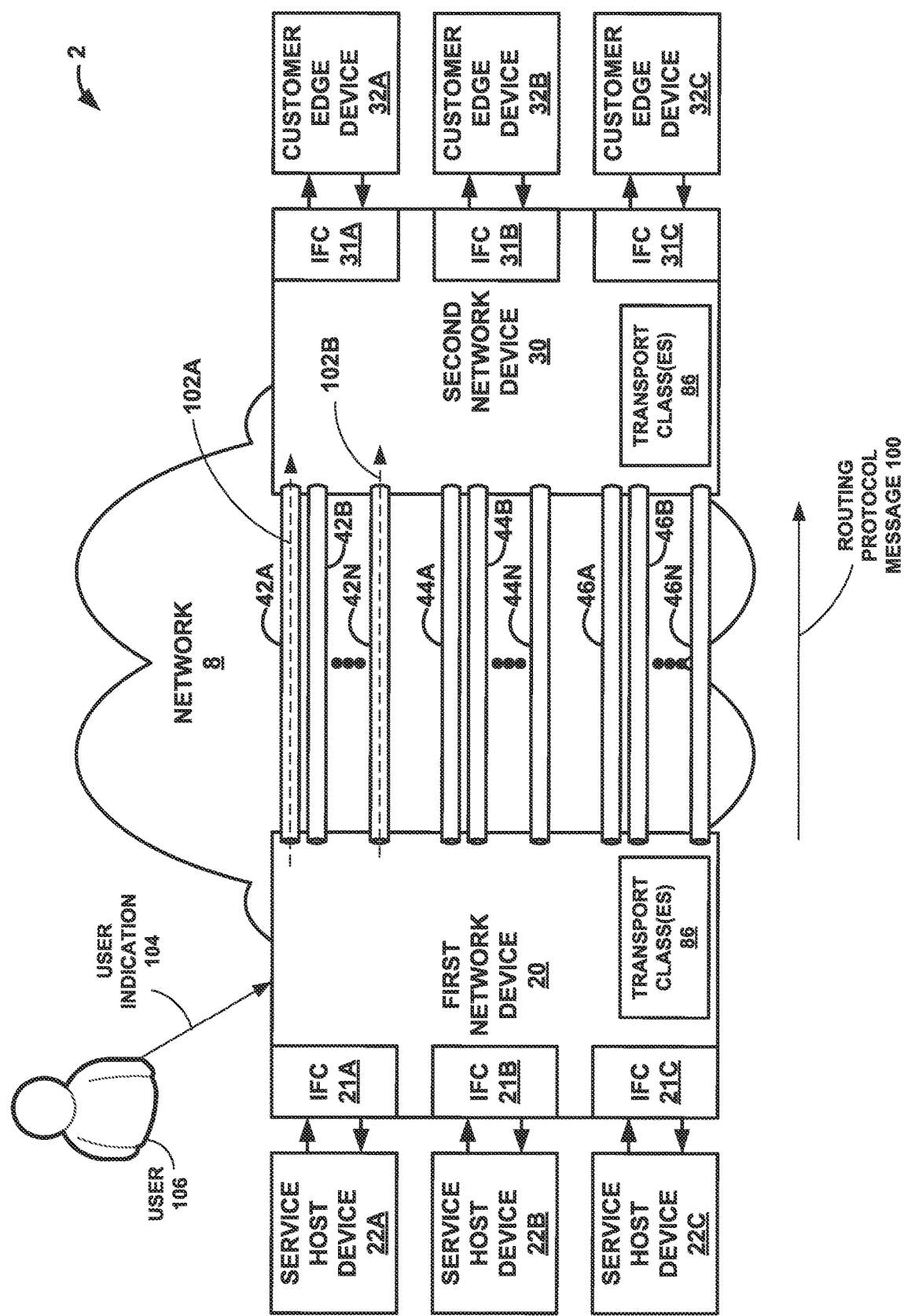
FIG. 1 is a block diagram illustrating a network system in which network traffic flows between a first network device and a second network device, in accordance with one or more techniques described herein.

In general, the techniques set forth herein enable a mechanism, referred to as "service mapping," to express association of service routes with underlay routes using routing protocol messages, such as Border Gateway Protocol (BGP) messages. The techniques set forth herein enable a framework for service mapping, and specify routing protocol procedures that enable dissemination of the service mapping information that may span across administrative domains. For example, the techniques disclosed herein enable the advertisement of multiple tunnels to the same destination. In some examples, the techniques disclosed herein define a new BGP transport address family, called "Transport VPN," that uses BGP-Virtual Private Network (VPN) technology and follows Network Layer Reachability Information (NLRI) encoding.

Additional information with respect to BGP-VPN technology is set forth in E. Rosen et al., "BGP/MPLS IP Virtual Private Networks (VPNs)," Internet Engineering Task Force (IETF) RFC 4364 (February 2006), the entire content of which is incorporated herein by reference. Additional information with respect to NLRI encoding is set forth in E. Rosen, "Using BGP to Bind MPLS Labels to Address Prefixes," Internet Engineering Task Force (IETF) RFC 8277 (October 2017), the entire content of which is incorporated herein by reference.

To facilitate service mapping, the tunnels in a network can be assigned to a service-specific group referred to herein as a "Transport Class." The tunnels could be created using any signaling protocol, such as Label Distribution Protocol (LDP), Resource Reservation Protocol (RSVP), BGP Labeled Unicast (BGP-LU) or Source Packet Routing in Networking (SPRING). The tunnels could also use native Internet Protocol (IP) or Internet Protocol version 6 (IPv6), as long as the tunnels can carry Multiprotocol Label Switching (MPLS) payloads. Tunnels may exist between different pair of end points. Multiple tunnels may exist between the same pair of end points.

Thus, a Transport Class comprises tunnels created by many protocols terminating in various nodes, each satisfying the properties of the class. For example, a "Gold" transport class may comprise tunnels that traverse the shortest path with fast re-route protection, a "Silver" transport class may hold tunnels that traverse shortest paths without protection, a "To NbrAS Foo" transport class may hold tunnels that exit to neighboring autonomous system "Foo," and so on.

The extensions specified herein can be used to create a routing protocol transport tunnel that potentially spans administrative domains, while preserving its Transport Class. In other words, the techniques of this disclosure enable establishing an end-to-end tunnel (e.g., comprised of one or more LSPs) that go over only a particular class of transport tunnels. Examples of domain are Autonomous System (AS), or Interior Gateway Protocol (IGP) area or level. Within each domain, there is a second level underlay tunnel used by the routing protocol to cross the domain. The second level underlay tunnels could be heterogeneous: Each domain may use a different type of tunnel, or use a different signaling protocol. A domain boundary may be demarcated by a rewrite of routing protocol nexthop to 'self' while re-advertising transport routes in routing protocol messages. The path uses MPLS label-switching when crossing inter-Autonomous System (AS) links and uses the native intra-AS tunnel of the desired transport class when traversing within a domain.

Service routes carry sufficient indication of the Transport Class they should be encapsulated over. A "route resolution" procedure on the ingress node selects from the Transport Class an appropriate tunnel whose destination matches the nexthop of the service route. If the service route is carried in a routing protocol message, the protocol nexthop (PNH) is generally carried as an attribute of the route specified by the routing protocol message. The PNH of the service route is also referred to as "service endpoint." The service endpoint may exist in the same domain as the service ingress node or lie in a different domain, adjacent or non-adjacent.

The disclosure sets forth herein enable various network techniques. For example, a network system as described herein models a "Transport Class" as "Transport Routing Information Base (RIB)" on a router, which comprises transport routes of a certain class. Furthermore, a network system as described herein extends a service route to include a mapping community that allows a network device to resolve the service route over a Transport Class corresponding to the mapping community, and thereby selecting a corresponding Transport RIB for finding nexthop reachability. A network device as described herein advertises transport routes in a Transport RIB via BGP without path hiding, using, e.g., BGP VPN technology and Add-path such that service routes in the receiving domains can also resolve over tunnels of associated Transport Class. Furthermore, the techniques described herein provide for a way for co-operating domains to reconcile between independently administered extended community namespaces, and interoperate between different transport signaling protocols in each domain.

FIG. 1 is a block diagram illustrating a network system 2 in which network traffic flows between a first network device 20 and a second network device 30, in accordance with one or more techniques described herein. As illustrated in FIG. 1, network system 2 includes first network device 20, second network device 30, service host devices 22A-22C (collectively, "service host devices 22"), and customer edge (CE) devices 32A-32C (collectively, "CE devices 32") interconnected by a network 8. Network 8 offers packet-based connectivity to service host devices 22 and CE devices 32 attached to network 8 via first network device 20 and second network device 30 for accessing one or more services provided by service host devices 22. Network 8 may represent a public network that is owned and operated by a service provider to interconnect a plurality of networks. In some examples, network 8 may implement Multi-Protocol Label Switching (MPLS) forwarding and in such instances may be referred to as an MPLS network or MPLS backbone. In some instances, network 8 represents a plurality of interconnected autonomous systems, such as the Internet, that offers services from one or more service providers.

Network 8 includes, as shown in the example of FIG. 1, first network device 20 and second network device 30 (collectively, "network devices 20, 30"), service host devices 22, and customer edge devices 32. First network device 20 may represent a Provider edge (PE) network device or ingress node, which may refer, as one example, to a router configured to interface with service host device 22 or other types of network devices, such as CE devices, in order to forward traffic via network 8. Second network device 20 may also represent, e.g., a PE network device, which again may refer to a router configured to interface with CE devices 32 or other types of network devices, such as service host devices, in order to forward network traffic via network 8. In other examples not depicted in FIG. 1, second network device 20 may represent a service node and may interface with one or more other service nodes to form a service chain for a network service that ultimately interfaces with one or more other PE devices that interface with CE devices 32.

Network devices 20, 30, in some cases, may each include a router such as a provider edge or customer edge router, a core router, or another type of network device, such as a switch. In this example, network devices 20, 30 each include a control unit (not illustrated in FIG. 1) that provides control plane functionality for the device. Additionally, network devices 20, 30 may each include one or more forwarding units (not illustrated in FIG. 1) that provide a data plane for processing network traffic.

First network device 20 and second network device 30 receive and send data packets via interfaces of interface cards 21A-21C ("IFCs 21") and via interfaces of interface cards 31A-31C ("IFCs 31"), respectively. Each of IFCs 21 and IFCs 31 (collectively, "IFCs 21, 31") may represent a separate line card insertable within a chassis (not shown) of network devices 20, 30. Example line cards include flexible programmable integrated circuit (PIC) concentrators (FPCs), dense port concentrators (DPCs), and modular port concentrators (MPCs). Each of IFCs 21, 31 may include interfaces for various combinations of layer two (L2) technologies, including Ethernet, Gigabit Ethernet (GigE), and Synchronous Optical Networking (SONET) interfaces, that provide an L2 interface for transporting network packets. In various aspects, each of network devices 20, 30 may include more or fewer IFCs.

Service host devices 22 may represent servers, databases, or other types of network devices that facilitate delivery of services via network 8. Although referred to as a single device, each of service host devices 22 may represent an ecosystem of one or more devices configured to provide a service, such as Voice over Internet Protocol (VoIP), streaming video, data analysis or analytics (for various purposes, including malware detection, virus detection, data mining, cryptography, etc.), machine learning, security—including authentication, authorization, and accounting (AAA), network address translation (NAT), encryption, decryption, or any other type of service capable of being provided via network 8. CE devices 32 may represent switches, hubs, routers, computing devices (including smartphones, laptops, desktops, workstations, etc.), gaming systems, smart speakers, smart televisions, or any other type of network capable device that is able to interface with second network device 30.

Each of underlay tunnels 42, tunnels 44, and tunnels 46 (collectively, "underlay tunnels 42, 44, 46" or "tunnels 42, 44, 46") may support a network service route between first network device 20 and second network device 30. Each of tunnels 42, 44, and 46 may traverse network 8 via one or more hops (which is one example way of referring to intervening network devices supporting network 8 that are not shown in the example of FIG. 1 for ease of illustration purposes). Each of tunnels 42, 44, and 46 may link the same pair of nodes (e.g., first network device 20 and second network device 30) such that a packet may travel between first network device 20 and second network device 30 via any one or more of tunnels 42, 44, and/or 46 in various different ways according to their respective characteristics. For example, each of the tunnels 42, 44, 46 may present different characteristics in terms of bandwidth, latency, high availability (or, in other words, operational time characteristics), etc. As such, different ones of tunnels 42, 44, and/or 46 may be more or less preferable for transporting network traffic associated with a particular network service than other tunnels 42, 44, and/or 46, although each of tunnels 42, 44, and/or 46 may be capable of transporting the network traffic associated with the network service to a destination (e.g., second network device 30).

Underlay tunnels 42, 44, 46 may be signaled, for example, using any combination of Resource Reservation Protocol-Traffic Engineering (RSVP-TE), RSVP-TE auto-mesh, Label Distribution Protocol (LDP), Border Gateway Protocol (BGP)-Labeled Unicast (BGP-LU), BGP Segment Routing-Traffic Engineering (BGP SR-TE), Static Label-Switched Path (LSP), Static SR-TE, Open Shortest Path First/ISIS-Segment Routing (OSFP/ISIS-SR), SRv6, or dynamic IP protocols such as IP-in-IP, Generic Routing Encapsulation (GRE), Segment Routing over User Datagram Protocol (SR-o-UDP), MPLS over UDP (MPLS-o-UDP). Where a label switched path (LSP) is used for transport, the LSP may be referred to herein as a "tunnel." In a network such as network system 2 with data-traffic being sent over tunnels 42, 44, 46 between a pair of nodes such as first network device 20 and second network device 30, a subset of tunnels of tunnels 42, 44, 46 may be preferred for carrying network traffic. In some examples, a first set of tunnels that is more preferred for forwarding network traffic of a particular service than a second set of tunnels may be categorized according to a different type than the second set of tunnels (e.g., other than in terms of tunnel coloration type, etc.). In some cases, a set of tunnels may be preferred equally with a preferred volumetric split of network traffic between the tunnels of a particular type.

A packet received by first network device 20 may, in some cases, be associated with one or more network services of a set of network services provided by service host devices 22. In some examples, first network device 20 may distribute routing protocol messages that comprise a payload prefix specifying the one or more service parameters (e.g., a service color or service type) associated with one or more services associated with network traffic. Such routing protocol messages may be e.g., an exterior gateway protocol such as BGP UPDATE messages sent in accordance with BGP. In some examples, such network services may be signaled using BGP, such as Layer-3 Virtual Private Network (L3VPN), Ethernet Virtual Private Network (EVPN), Layer-2 Virtual Private Network (L2VPN), Family inet/inet6, BGP Virtual Private LA service (VPLS), or Next-Generation Multicast Virtual Private Network (NG-MVPN). In other examples, such network services may be signaled using LDP, such as LDP VPLS or LDP Virtual Private Wire Service (VPWS). In other examples, each packet forwarded and/or received by first network device 20 and second network device 30 (collectively, "network devices 20, 30") may include information which indicates one or more service colors that identify one or more services associated with the packet.

Services may correspond to one or more "service colors" and tunnels may correspond to one or more "tunnel colors." Colors, in some cases, are generic labels which identify a respective service or tunnel as being a part of a common type. For example, each tunnel that includes the color "blue" may be of a first type and each tunnel that includes the color "red" may be of a second type. As non-limiting examples, tunnels assigned to a particular color may have one or more characteristics in common, such as a similar latency, bandwidth, packet drop rate, address family (e.g., IPv4 or IPv6), software license agreement (SLA) requirements, quality requirement, tunneling protocol, path computation algorithm, virtual topology, virtual slice, etc. The use of "color" to group tunnels is referred to herein as "tunnel coloration."

Service routes 102A-102B (collectively, "service routes 102", and which also may be referred to herein as "overlay routes") are logical routes from a service host device 22 that generates network traffic associated with a particular network service to a customer edge device 32 that receives the network traffic associated with the network service. Service routes 102 may cross multiple domains and are supported by underlay tunnels 42, 44, 46 across the multiple domains. Typically, network devices 20, 30 may prefer to resolve a service route 102 for a service of a particular service color to one or more underlay tunnels 42, 44, 46 having a tunnel color that corresponds to the service color. The process of "resolving" a service route 102 for a service to one or more underlay tunnels 42, 44, 46 may also be referred to as "mapping" a service to one or more underlay tunnels 42, 44, 46. With respect to the foregoing example, network devices 20, 30 may prefer to resolve service route 102A for a service having a service color corresponding to the color "blue" to one or more underlay tunnels 42, 44, 46 having a "blue" tunnel color, and service route 102B for a service having a service color corresponding to the color "red" to one or more underlay tunnels 42, 44, 46 having a "red" tunnel color. In some examples, a color is a 32-bit value. In some examples, a service color associates a service type with a protocol next hop (PNH) (also referred to herein as a "service endpoint").

In some examples, first network device 20 and second network device 30 may maintain, for any given flow, state information indicating a service color for each flow. As such, first network device 20 and second network device 30 may select the corresponding tunnel without inspecting each individual packet and instead reference the state information for the corresponding flow to identify the corresponding service color and select a tunnel color defined by a transport class for a corresponding network service. That is, the tunnel selection may, in some cases, be pre-determined solely based on the service route coloring without having to look at packet header or payload information distinguishing different packets by service type (for the same flow) which may otherwise (e.g., other than class of service—COS—marking) share the flow-identifying fields. In this respect, first network device 20 may only utilize the color-marking on service routes 102 and one or more tunnels specified by a transport class for the network service to select the tunnel (and without referencing any color marking in the packets).

In any event, a user may assign one or more tunnel colors to each of tunnels 42, 44, 46. In some examples, a user may not assign a color to one or more of tunnels 42, 44, 46. Such tunnels that are not assigned a color may be described herein as an "uncolored" tunnel. In some examples, network devices 20, 30 may receive, from a user, a routing protocol message that comprises a payload prefix specifying one or more attributes (e.g., tunnel color) associated with each of tunnels 42, 44, 46. Further, network devices 20, 30 may receive, from a user, a routing protocol message that comprises a payload prefix specifying one or more service parameters (e.g., a service color or service type) of a network service associated with a received packet. Such routing protocol messages may be e.g., exterior gateway protocol messages such as BGP UPDATE messages sent in accordance with BGP. In this way, network devices 20, 30 may determine one or more of tunnels 42, 44, 46 in which to forward the packet based on one or more attributes (such as, e.g., tunnel color) associated with each of tunnels 42, 44, 46.

In some instances, first network device 20 resolves service route 102A for a service associated with a particular service color to one or more tunnels 42, 44, 46 associated with a tunnel color that corresponds to the service color. For example, first network device 20 may attempt to resolve service route 102A for a "red" service to one or more "red" tunnels 42, and forward network traffic associated with the "red" service along the one or more "red" tunnels 42 to a destination (e.g., a destination IP address prefix for the network traffic), such as second network device 30. However, if the one or more "red" tunnels 42 are unavailable, first network device 20 may be unable to resolve service route 102A for the "red" service to the one or more "red" tunnels 42 and therefore may be unable to forward the network traffic. In this situation, first network device 20 may drop the network traffic associated with the "red" network service. First network device 20 may drop such traffic even where an alternate route to the destination of the network traffic may otherwise be available.

For example, even if the one or more "red" tunnels 42 are unavailable, an alternate but less preferred route may still be available. Where one or more preferred (e.g., primary) tunnels 42 are unavailable but an alternate route (e.g., one or more fallback tunnels 44, 46) is available, it is more desirable for network deice 20 to forward the network traffic associated with the network service to its destination along an alternate route, even if such an alternate route is an undesirable path, than to allow network device 20 to simply drop the traffic.

In some examples, first network device 20 may be able to statically map a single backup tunnel for use by all tunnels without regard to the particular service associated with the network traffic. In other examples, first network device 20 may be able to statically map a single backup tunnel for use by another single tunnel. However, such a scheme is not robust because when both the primary tunnel and the single fallback tunnel are unavailable, first network device 20 may nevertheless be forced to drop the network traffic. Furthermore, because such a scheme does not consider the different types of network services transported by different primary tunnels, the single fallback tunnel may not be suitable as an alternate route for all network traffic of various different network services (e.g., where the single fallback tunnel does not meet various latency, bandwidth, or packet drop rate requirements, quality requirements, SLA requirements, etc. required by the network service).

The disclosure uses the following terms herein:
LSP: Label Switched Path.
TE: Traffic Engineering.
SN: Service Node.
BN: Border Node.
TN: Transport Node, P-router.
BGP-VPN: VPNs built using RFC-4364 mechanisms.
RT: Route-Target extended community.
RD: Route-Distinguisher.
PNH: Protocol-Nexthop.
Service Family: BGP address family used for advertising routes for "data traffic," as opposed to tunnels.
Transport Family: BGP address family used for advertising tunnels, which are in turn used by service routes for resolution.
Transport Tunnel (also referred to herein as "underlay tunnel" or "underlay transport tunnel"): A tunnel, such as underlay tunnels 42, 44, 46, over which a service may place traffic. These tunnels can be Generic Routing Encapsulation (GRE), User Datagram Protocol (UDP), LDP, RSVP, or Segment Routing Traffic Engineering (SR-TE) Tunnels. Such a tunnel may use a specific tunneling technology to carry multiple payload types.
Domain: A domain of the network containing an SN and a BN, under a single administrative control that has a tunnel between the SN and the BN. An end-to-end tunnel spanning several adjacent tunnel domains can be created by "stitching" them together using labels. In some examples, the domain is a tunnel domain (e.g., an AS or intra-AS-region) containing SN, BN, and connected via a Transport-tunnel type. MPLS label-swap may be used between these tunnel-domains to stitch transport-tunnels of different-types.
Transport Class: A group of transport tunnels 42, 44, 46 offering the same type of service. For example, tunnel within a transport class may have, e.g., similar characteristics such as bandwidth, latency, etc.
Transport Class RT: A BGP-VPN Route-Target used to identify a specific Transport Class.
Transport RIB: At the SN and BN, a Transport Class has an associated Transport RIB that holds its transport routes. A transport-RTI RIB (e.g., <class>.inet.3) used to collect signaling information related to Tunnels of a certain color. (e.g., "resolution-rib" in RPD CLI). "inet.3" is also a transport-rib that collects best-effort tunnels, and exists in transport-RTI "master."
Transport RTI: A Routing Instance that is a container of Transport RIB and associated Transport Class RT and RD. In some examples, the Transport RTI is a BGP-VPN routing-instance collecting tunnels of a TE-Color. It imports and exports Transport Class RT. Tunnel-destination addresses in this routing-instance come from the "provider-namespace." This is different from user-VRFs, which contain prefixes in "customer-namespace."
Transport VPN: Set of Transport RTIs importing same Transport Class RT, such as the same Transport Class RT. These are in turn stitched together to span across tunnel domain boundaries using a mechanism similar to Inter-AS option-b to swap labels at BN (nexthop-self). Service routes resolve over transport routes collected in transport-VPN instances, using the transport class construct.
Fallback-scheme: An ordered "set of transport classes" defined by user, which creates an ordered "set of transport-ribs." A fallback-scheme may be used for resolving PNHs. The order specifies the desired resolution fallback. The resolution fallback may alternatively be referred to as a "Resolution-tree." A user can define multiple fallback-schemes that specify intent on desired "resolution-fallback."
Mapping Community: Community on a service route, that maps the service route to resolve over a Transport Class.
Rib-group: RPD construct to leak routes from one rib (e.g. inet.3 or inetcolor.3) to another (<class>.inet.3).

The techniques of the disclosure enable network device 20 to disseminate network service-specific information across administrative domains. For example, network device 20 receives an indication of a route target, a route distinguisher, and one or more underlay tunnels 42, 44, 46 configured to support service route 102A. In response to the indication, network device 20 defines a transport class 86 of a plurality of transport classes 86, the transport class 86 associated with the route target and defining a service-specific fallback scheme for resolving service route 102A across one or more underlay tunnels 42, 44, 46 across a domain between network devices 20, 30. Defining the transport class 86 may include storing data associated with the transport class 86 (including a transport class name) in a data structure of the network device. The route target of the first transport class is different from route targets of each other transport class of the plurality of transport classes, i.e., has a different value. The route target for each transport class 86 may correspond to a service color of a network service. The route distinguisher may identify a tunnel endpoint so as to disambiguate multiple instances of the same tunnel endpoint (e.g., service endpoint) IP address, but having different transport classes. In some examples, multiple service routes or service families (e.g., for different network services) may use the same transport class 86. The transport class route target enables an on-wire format for advertising a transport class 96 to other BGP-speakers (e.g., network device 30), and allows a network device 20, 30 to import the routes into the correct transport RIBs at the receiving end.

In some examples, network device 20 receives the indication from a user. In some examples, network device 20 receives the indication as a transport route specified via a routing protocol message. A transport route (also referred to herein as a "tunnel route," an "ingress route," or an "underlay route") is a route at an ingress node of a tunnel 42, 44, 46 that indicates the required encapsulation to send network traffic into the tunnel 42, 44, 46. As described herein, a service route resolves a PNH via a transport route to send the network traffic associated with a particular network service via the tunnel 42, 44, 46.

Subsequently, network device 20 receives service route 102 for a network service and resolves the service route. For example, as described herein, each service route 102 may be extended to specify a mapping community. Network device 20 determines a correspondence of the mapping community of service route 102A to a transport RIB for each transport class 86 to identify a transport class 86 corresponding to service route 102A. In some examples, network device 20 stores an association between service route 102 and the corresponding transport class 86.

Network device 20 receives network traffic and determines that the network traffic is associated with the network service of service route 102A (and therefore, service route 102A). Further, network device 20 identifies a transport class 86 based on the stored association between service route 102A and the transport class 86 (e.g., based on a correspondence of the mapping community specified by service route 102A and a transport RIB for transport class 86). Network device 20 forwards the network traffic along the one or more underlay tunnels 42, 44, 46 specified by the transport class 86 corresponding to service route 102A. In this fashion, network device 20 may use a transport class 86 corresponding to a mapping community specified by, e.g., service route 102A to resolve service route 102A to one or more transport tunnels 42, 44, 46 and thereby forward network traffic associated with a network service for service route 102A to, e.g., CE devices 32.

In some examples, each transport class 86 may specify an order of application of the one or more transport tunnels 42, 44, 46. For example, a transport class 86 may specify that service route 102A, corresponding to a "red" network service, is preferably resolved over one or more "red" underlay tunnels 42, 44, 46, but if such tunnels are available, service route 102A may be resolved over one or more "blue" underlay tunnels 42, 44, 46. In this fashion, network device 20 may resolve service route 102A to some one of transport tunnels 42, 44, 46 even where one or more most-preferable transport tunnels 42, 44, 46 are unavailable to transport traffic associated with the network service.

Furthermore, as described in more detail below, network device 20 may exchange service mapping information with other network devices, e.g., network device 30 by sending a transport route specified via a routing protocol message. For example, network device 20 may receive a routing protocol message 100 specifying a transport route. As described herein, a "transport route" comprises information defining a transport class 86 that may be used to resolve service route 102A for a specific network service to one or more underlay tunnels 42, 44, 46 (e.g., for resolving service route 102A to the one or more underlay tunnels 42, 44, 46). In some examples, the transport route comprises a route target, a route distinguisher, and one or more underlay tunnels 42, 44, 46. In some examples, the route target operates as a mapping community to specify a resolution scheme as described in more detail below.

In this fashion, network device 20 may send transport class definitions to network device 30. Routing protocol message 100 to network device 30 may enable network device 30 to resolve service route 102A across one or more underlay tunnels (not depicted in FIG. 1). The use of such routing protocol messages allows network system 2 to propagate such information across multiple administrative domains. In some examples, the routing protocol messages are, e.g., exterior gateway messages such as BGP UPDATE messages sent in accordance with a BGP extended community that describe, e.g., the route target and one or more underlay tunnels.

Using the techniques described above, network device 20 may define multiple "colored" transport planes for forwarding network traffic. For example, network device 20 may define a transport class 86 for each service color supported by network device 20 (e.g., red, gold, bronze, etc.). Each transport class 86 may specific one or more underlay tunnels 42, 44, 46 and an order of application of the one or more underlay tunnels 42, 44, 46 for forwarding network traffic for a network service corresponding to the service color of the transport class 86. In this fashion, network device 20 may implement a unique forwarding scheme for network traffic according to service color (e.g., service type) of the network service associated with the network traffic.

Tunnels 42, 44, 46 are described herein mainly with respect to MPLS Label-switched Paths (LSPs). However, the techniques set forth herein may also be implemented in similar manner for non-MPLS transport tunnels where the tunnels are capable of carrying an MPLS payload.

The techniques of the disclosure may provide specific improvements to the computer-related field of computer networking that have practical applications. For example, the techniques of the disclosure enable a network system to build multiple colored transport planes across multiple domains in a scalable fashion without extensive changes to deployed network devices. Further, the techniques of the disclosure enable scaling out, instead of scaling up, the resolver code such that a network device as described herein may exhibit improved scalability and performance attributes over other techniques for mapping service routes to underlay tunnels. The techniques of the disclosure may be easier to implement with minimal changes to the operation of existing network devices. For example, the techniques of the disclosure may enable simple, modular design and maintainability of the routing protocol process of a network device when scaling network devices of a network system while reducing regressing risk.

Figure 2:
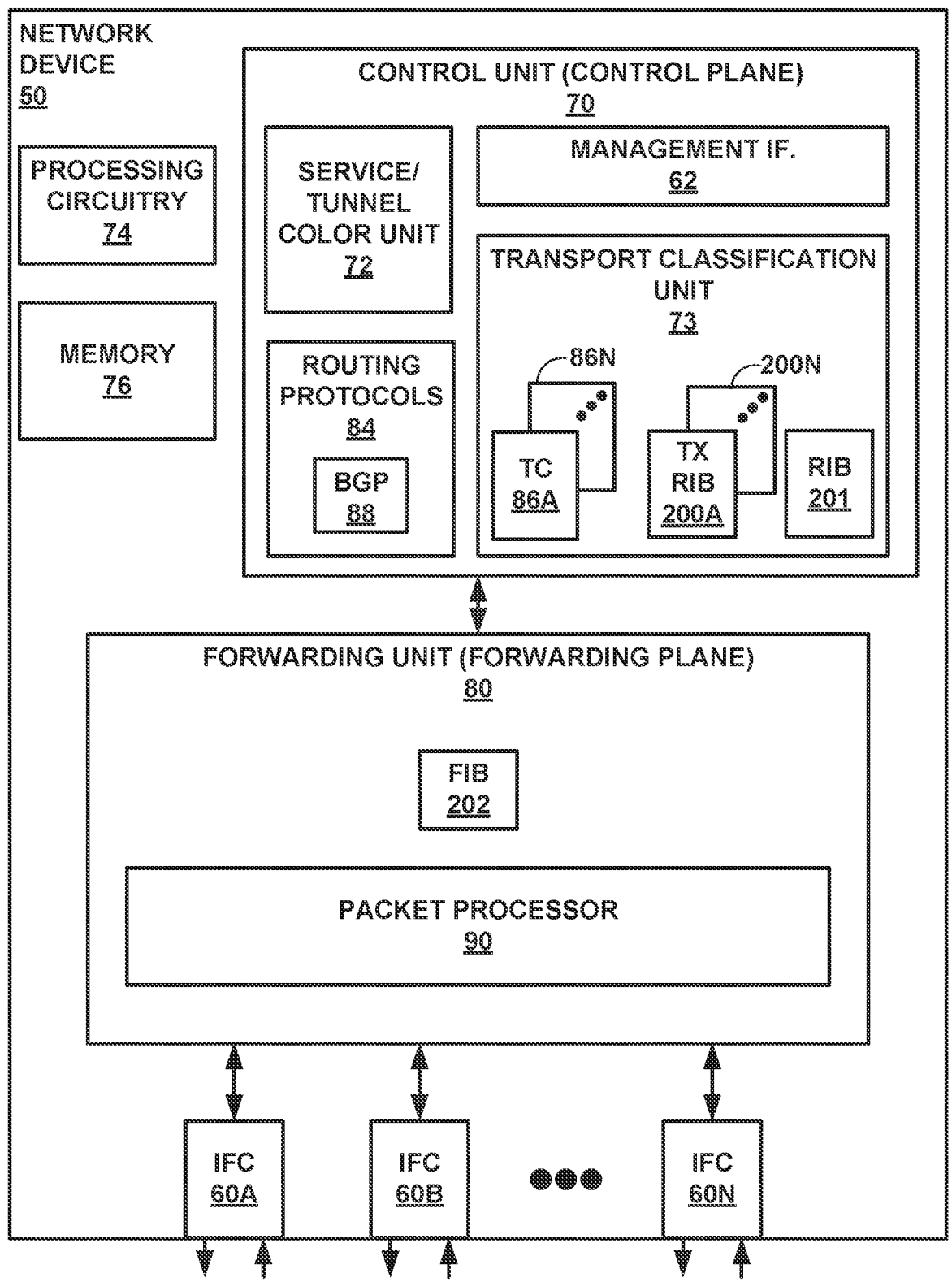
FIG. 2 is a block diagram illustrating an example of a network device, in accordance with one or more techniques of this disclosure.

FIG. 2 is a block diagram illustrating an example of a network device 50, in accordance with one or more techniques of this disclosure. As seen in FIG. 1, network device 50 includes processing circuitry 74, memory 76, IFCs 60A-60N (collectively, "IFCs 60"), management interface 62, control unit 70, and forwarding unit 80. Control unit 70 includes service/tunnel color unit 72 and transport classification unit 73, which stores a plurality of transport classes 86A-86N (collectively, "transport classes 86"), a plurality of transport routing information bases (RIBs) 200A-200N (collectively, "transport RIBs 200"), and a RIB 201. Each transport RIB 200 corresponds to one of transport classes 86. RIB 201 contains general routing information that is not associated with any particular transport class. Forwarding unit 80 includes forwarding information base (FIB) 202, and packet processor 90. In some examples, network device 50 may be an example of first network device 20 of FIG. 1 and IFCs 60 may be an example of IFCs 21 of FIG. 1. In some examples, network device 50 may be an example of second network device 30 of FIG. 1 and IFCs 60 may be an example of IFCs 31 of FIG. 1.

Network device 50 may represent a router such as a provider edge or customer edge router, a core router, or another type of network device, such as a switch, ingress node, service node, or border node. In this example, network device 50 includes a control unit 70 that provides control plane functionality for the device. Forwarding unit 80 may provide a data plane for processing network traffic. In this way, forwarding unit 80 may be referred to herein as a "forwarding plane." Forwarding unit 80 may receive and send data packets via interfaces of IFCs 60. Control unit 70 may be connected to each forwarding unit 80 by an internal communication link. The internal communication link may include a 100 Mbps Ethernet connection, for instance. Control unit 70 configures, by sending instructions and other configuration data via the internal communication link, forwarding unit 80 to define control processing operations applied to packets received by forwarding unit 80.

Processing circuitry 74 may execute control unit 70 and forwarding unit 80. Processing circuitry may execute software instructions, such as those used to define a software or computer program, stored to memory 76, which may be a computer-readable storage medium, such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause processing circuitry 74 to perform techniques described herein. Alternatively, or in addition, network device 50 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 70 may execute a plurality of applications, including service/tunnel color unit 72 and transport classification unit 73. Service/tunnel color unit 72 may perform, in response to receiving information via management interface 62, one or more operations. In some examples, the one or more operations may include one or more of assigning a tunnel color to one or more tunnels (e.g., one or more tunnels of tunnels 42, 44, 46), linking a service color to one or more tunnel colors such as a primary tunnel color and one or more fallback tunnel colors, and implementing instructions for load balancing network traffic. In some examples, and as described in more detail below, transport classification unit 73 may define, based on received configuration data, transport classes 86, resolve a service route 102 to one or more underlay routes (such as service route 102A and underlay routes 42, 44, 46 of FIG. 1), store a correspondence of a service route 102 to one of transport classes 86 (e.g., in transport RIBs 200), and/or identify one of transport classes 86 that corresponds to a service route 102 for received network traffic for a network service for the service route.

Control unit 70 includes various control plane networking protocols 84 that perform routing functions for network device 50. Control unit 70, for example, executes software instructions to implement one or more protocols 84. For example, protocols 84 may include one or more routing protocols, such as BGP 88, for exchanging routing information with other network devices and for updating routing transport RIBs 200. Other routing protocols may include, for example, IS-IS and OSPF.

Forwarding unit 80 includes packet processor 90 that processes packets by performing a series of operations on each packet over respective internal packet forwarding paths as the packets traverse the internal architecture of network device 50. Packet processor 90 of forwarding unit 80, for instance, includes one or more configurable hardware chips (e.g., a chipset) that, when configured by applications executing on control unit 70, define the operations to be performed by packets received by forwarding unit 80. Each chipset may in some examples represent a "packet forwarding engine" (PFE). Each chipset may include different chips each having a specialized function, such as queuing, buffering, interfacing, and lookup/packet processing. Each of the chips may represent application specific integrated circuit (ASIC)-based, field programmable gate array (FPGA)-based, or other programmable hardware logic.

Operations may be performed, for example, on each packet by forwarding unit 80 or other components of network device 50 to which the packet is directed prior to egress, such as one or more service cards. Packet processor 90 may process packets to identify packet properties and perform actions bound to the properties. Packet processor 90 may include forwarding path elements that, when executed, cause the packet processor to examine the contents of each packet (or another packet property, e.g., incoming interface) and on that basis make forwarding decisions, apply filters, and/or perform accounting, management, traffic analysis, and load balancing, for example. In one example, packet processor 90 arranges forwarding path elements as next hop data that can be chained together as a series of "hops" in a forwarding topology along an internal packet forwarding path for network device 50. The result of packet processing determines a manner in which a packet is forwarded or otherwise processed by packet processor 90 of forwarding unit 80 from its input interface on one of IFCs 60 to, at least in some cases, its output interface on one of IFCs 60.

In many instances, the forwarding path elements perform lookup operations, such as a tree (or trie) search, a table (or index) search, a filter determination and application, or a rate limiter determination and application. Lookup operations locate, within a lookup data structure (e.g., a lookup tree), an item that matches packet contents or another property of the packet or packet flow, such as the inbound interface of the packet.

Applications configured for execution by network device 50 determine one or more control processing operations to be applied to packets by packet processor 90. In network device 50, applications include service/tunnel color unit 72 and transport classification unit 73. Applications may configure packet processor 90 to perform the control processing operations by sending, to forwarding unit 80, data representing the control processing operations. Such data may include forwarding path elements representing high-level packet processing requirements (e.g., route lookup and filtering). Control processing operations may include fundamental packet forwarding operations such as input packet processing, route lookup, and output packet processing, as well as service functions such as packet filtering or access control, statistical sampling, traffic policing, rate limiting, and accounting.

Forwarding unit 80 may perform one or more operations in order to forward packets through packet processor 90. For example, forwarding unit 80 includes FIB 202. FIB 202 may be a radix tree programmed into dedicated forwarding chips, a series of tables, a complex database, a link list, a radix tree, a database, a flat file, or various other data structures. FIB 202 included in forwarding unit 80 may include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

In some examples, control unit 70 receives an indication of a route target, a route distinguisher, and one or more underlay tunnels 42, 44, 46 configured to support service route 102A. Transport classification unit 73 defines, based on the indication, transport class 86A that comprises the route target and defines a service-specific fallback scheme for resolving, e.g., service route 102A of FIG. 1 across one or more underlay tunnels 42, 44, 46 of FIG. 1. In some examples, control unit 70 receives the indication from a user via management interface 62. In some examples, control unit 70 receives a routing protocol message that specifies a route target and one or more underlay tunnels (e.g., as a transport route) that defines the transport class 86.

Each transport class 86 is defined as a set of transport tunnels 42, 44, 46 that share certain characteristics useful for underlay tunnel selection. The route target of transport class 86A is different from route targets of each other transport class 86 and may correspond to a service color of a network service of a plurality of network services. The route distinguisher may identify a tunnel endpoint so as to disambiguate multiple instances of the same tunnel endpoint (e.g., service endpoint) IP address, but having different transport classes 86. On the wire, a transport class is represented as the Transport Class RT, an example of which is a Route-Target extended community. A transport Class 86 is configured at both an SN and a BN, along with attributes like RD and Route-Target. Creation of transport class 86A instantiates the associated transport RIB 200A and a transport routing instance to contain them. In some examples, a user may configure a network device to classify an underlay tunnel 42, 44, 46 into an appropriate transport class 86, which causes control unit 70 to install the transport routes of the underlay tunnel in the corresponding transport RIB 200A. Control unit 70 may then advertise these transport routes via a routing protocol message such as BGP.

In some examples, in the event that resolution of service route 102 over a preferred, or "primary" transport class 86 fail, control unit 70 may resolve a service route 102 over less-preferred transport classes 86. To accomplish this, a set of service routes 102 may be associated with a user-configured "resolution scheme." The resolution scheme comprises a primary transport class (e.g., transport class 86A), and an ordered list of fallback transport classes 86. As described herein, to implement such a resolution scheme, a service route 102 is extended to include a community called a "mapping community." In some examples, this community is a BGP extended community. The mapping community specifies a particular resolution scheme of a plurality of resolution schemes. Each resolution scheme identifies a primary transport class 86 and one or more fallback transport classes 86. Where no fallback transport classes 86 are specified, service route 102 uses the transport class RT associated with the primary Transport Class 86A as the mapping community.

Control unit 70 associates a service route 102 (e.g., a service route received via BGP), with a resolution scheme during import processing. During import processing, control unit 70 compares the mapping community specified by a service route 102 to mapping communities of stored resolution schemes to determine a resolution scheme for use when resolving a PNH for service route 102. If service route 102 specifies more than one mapping community, control unit 70 selects the first mapping community of service route 102 that matches a mapping community of a stored resolution scheme for resolution across underlay tunnels 42, 44, 46.

In some examples, control unit 70 receives a routing protocol message that specifies a transport route for defining a transport class 86 (e.g., via a BGP transport-VPN family). In some examples, the transport route specifies a resolution scheme that contains only a primary transport class 86 without any fallback transport classes 86. In this example, the transport class RT of the transport route identifies the primary transport class 86. Thus, the transport class RT functions as the mapping community for transport-VPN routes.

A transport route received in BGP Transport-VPN family uses a resolution scheme that contains only the primary Transport Class without any fallbacks. The primary Transport Class is identified by the Transport Class RT carried on the route. Thus, a transport route (e.g., such as a transport-VPN route) may use the transport class RT as a mapping community.

Each of transport RIBs 200 may describe a topology of network 2 in which network device 50 resides that is specific to a corresponding network service. Transport RIBs 200 may also include transport routes through shared trees in network 2. Transport RIBs 200 describe various transport routes within network 2, and the appropriate next hops for each route, i.e., the neighboring routing devices along each of the transport routes. RIB 201 stores routes not affiliated with any particular transport class. In some examples, network device 50 may not include a separate RIB 201, and may only include transport RIBs 200. Control unit 70 may analyze information stored in a transport RIB 200 and RIB 201 and generate forwarding information for forwarding unit 80, which is stored in FIB 202. FIB 202 may associate, for example, network destinations with specific next hops and corresponding IFCs 60 and physical output ports that are used to forward received network traffic onto a transport tunnel for the correct transport class, based on the received transport routes.

Subsequently, control unit 70 receives service route 102A for a network service and resolves the service route. For example, as described herein, service route 102A is extended to specify a mapping community. Transport classification unit 73 determines a correspondence of the mapping community of service route 102A to a transport RIB 200 for each transport class 86 to identify transport class 86A as corresponding to service route 102A. In some examples, transport classification unit 73 stores an association between service route 102A and corresponding transport class 86A in memory 76. In some examples, transport classification unit 73 installs, in transport RIB 200A, a transport route for service route 102A across one or more underlay tunnels 42, 44, 46. Transport RIB 200 is a routing-only RIB that is not installed in the forwarding path. However, the routes in transport RIB 200 are used to resolve reachability of a PNH for each service route 120. Control unit 70 creates a transport RIB 200 when configuring the corresponding transport class 86.

Service routes 102 that want to use a specific transport class 86A confine the scope of nexthop resolution to the set of transport routes contained in the corresponding transport RIB 200A. Transport RIB 200A is, e.g., a "Routing Table" as described in Section 9.1.2.1 of Y Rekhter et al., "A Border Gateway Protocol 4 (BGP-4)," Internet Engineering Task Force (IETF) RFC 4271 (January 2006), the entire content of which is incorporated herein by reference. Transport routes in transport RIB 200A are exported out in a 'Transport-VPN' address family.

In some examples, a BGP VPN routing instance is used as a container for transport RIBs 200. The BGP VPN routing instance imports and exports routes in each transport RIB 200 with a corresponding transport class RT. Tunnel destination addresses in the context of this routing instance may come from the "provider namespace." This is different from user virtual routing functions (VRFs) for example, which contain prefixes in "customer namespace." The transport routing instance uses the RD and RT configured for the transport class 200.

Network device 50 receives, via IFCs 60, network traffic. Control unit 70 determines that the network traffic is associated with the network service corresponding to the mapping community of service route 102A. Further, transport classification unit 73 identifies transport class 86A as corresponding to service route 102A based on the stored association between service route 102A and the transport class 86A. Control unit 70 causes forwarding unit 80 to forward the network traffic along the one or more underlay tunnels 42, 44, 46 specified by the transport class 86 corresponding to service route 102A. For example transport classification unit 73 further retrieves, from transport RIB 200A, the transport route for service route 102A and forwards the network traffic to a PNH for the network service specified by transport RIB 200A. In some examples, to forward the network traffic to the PNH, forwarding unit 80 retrieves, from FIB 202, a nexthop for the PNH and forwards, via IFCs 60, the network traffic to the nexthop for the PNH.

Furthermore, network device 50 may exchange service mapping information with other network devices, e.g., network device 30 of FIG. 1. For example, control unit 70 may generate a routing protocol message specifying a transport route. The transport route defines transport class 86A so as to provide information to other network devices for resolving service route 102A along one or more underlay tunnels such that the recipient network device may continue to forward the network traffic for the network service in the manner specified by transport class 86A. In some examples, the routing protocol messages are, e.g., exterior gateway messages such as BGP UPDATE messages sent in accordance with a BGP extended community that describe the route target and the one or more underlay tunnels. In some examples, the routing protocol message further specifies a route target for the one or more transport routes 42, 44, 46. In some examples, the routing protocol message further specifies a color of the one or more transport routes 42, 44, 46.

Alternatively, network device 50 may receive, from another network device, the routing protocol message that specifies a transport route (e.g., via BGP). Control unit 70, with appropriate signaling information, can associate transport routes for underlay tunnels 42, 44, 46 to the appropriate transport class 86. For example, for a Transport-VPN family (Subsequent Address Family Identifier (SAFI) 75) routes, the route target specified by the routing protocol message indicates a specific one of transport classes 86. For BGP-LU family (SAFI 4) routes, control unit 70 may import a policy based on communities or inter-AS source-peer to assign underlay tunnels to the desired transport class 86.

In one example where network device 50 receives a routing protocol message specifying a transport route, the routing protocol message is received via BGP Segment Routing Traffic Engineering (SRTE), which encodes a transport class 86 as an integer "color" in the NLRI as "Color: Endpoint." The color can be mapped to a transport class 86 during import processing by control unit 70. Additional information with respect to BGP-SRTE is set forth in S. Previdi, "Advertising Segment Routing Policies in BGP," Internet Engineering Task Force (IETF) draft-ietf-idr-segment-routing-te-policy-08 (Nov. 18, 2019), available at https://tools.ietf.org/html/draft-ietf-idr-segment-routing-te-policy-08, the entire content of which is incorporated herein by reference. The color of a transport class 86 may map to a community (e.g., as specified by a service route 102) or route-target that installs a transport route to underlay tunnels 42, 44, 46 for a service endpoint in the appropriate Transport RIB 200. The BGP-SRTE transport route, when advertised out to BGP speakers, may be advertised in a Transport-VPN family with a transport class RT and a new label. The MPLS swap route thus installed for the new label may pop the label and deliver decapsulated-traffic into the path determined by the SRTE transport route.

Figure 3:
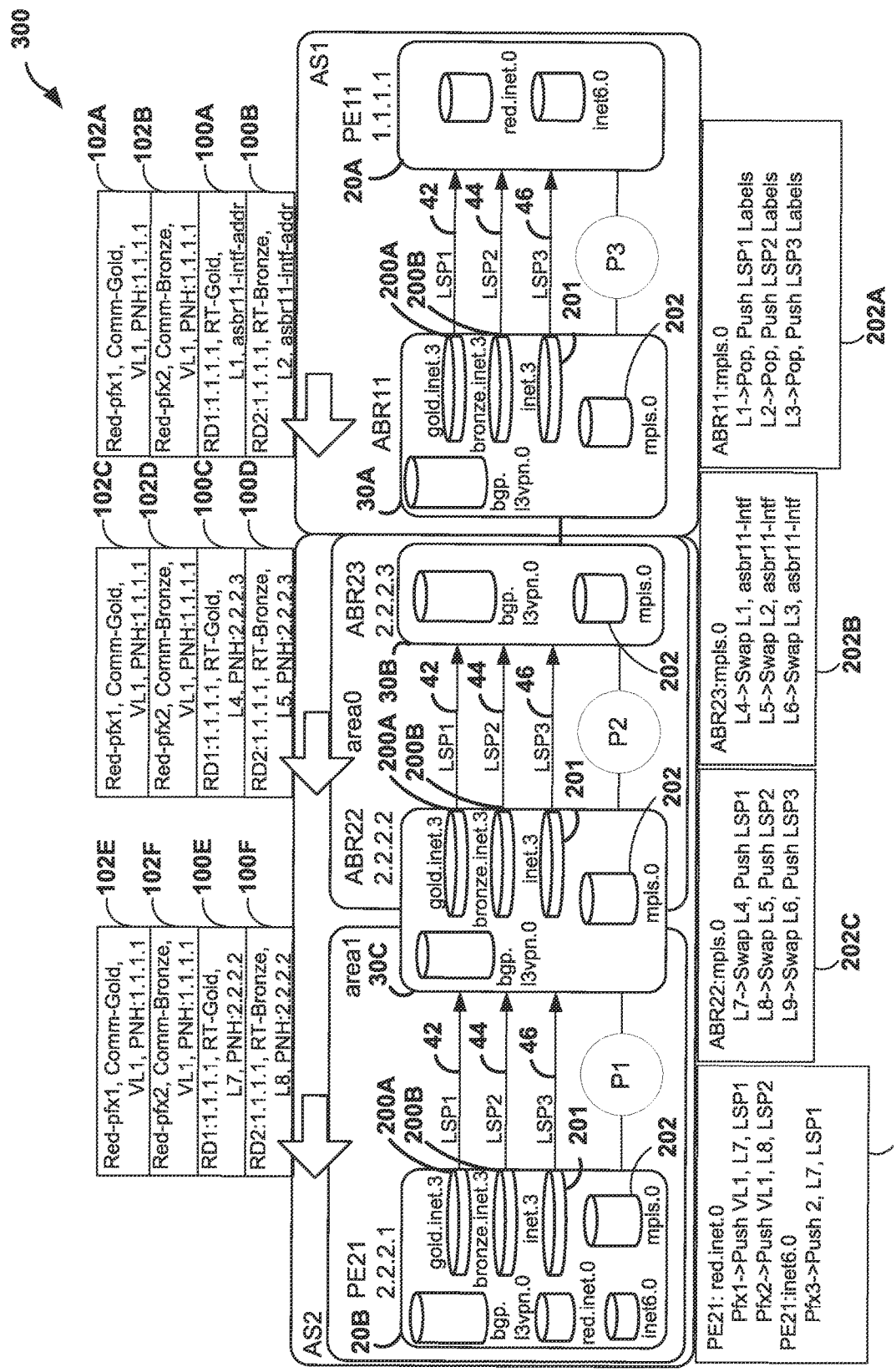
FIG. 3 is a block diagram illustrating a network system in which network traffic flows between network devices, in accordance with one or more techniques described herein.

FIG. 3 is a block diagram illustrating a network system in which network traffic flows between network devices 20A, 30A-30C, and 20B, in accordance with one or more techniques described herein. In the example of FIG. 3, network devices 20A and 20B (collectively, "network devices 20") may be examples of ingress nodes, and network devices 30A-30C (collectively, "network devices 30") may be examples of service nodes. Further, network device 20A may operate as an example of network device 20 of FIG. 1, and network devices 30A-30C and 20B may operate as an example of network device 30 of FIG. 1.

In a network, one may have different transport tunnels 42, 44, 46 (MPLS LSPs, IP-tunnels) from a source endpoint Sx to a destination endpoint Dx. For example, as depicted in of FIG. 3, network 300 signals transport tunnels 42, 44, 46 between network device 20B (e.g., acting as a source node) and network device 30C (acting as a destination node). Similarly, network 300 signals transport tunnels 42, 44, 46 between network device 30C (e.g., acting as a source node) and network device 30B (acting as a destination node) and between network device 30A (e.g., acting as a source node) and network device 20A (acting as a destination node).

A network system may also have multiple LSPs (e.g., LSP1, LSP2, and LSP3 in FIG. 3) from a source node to a destination node. Each LSP can have a different traffic engineering (TE) characteristics. These TE-characteristics can be broadly classified into different classes or colors (e.g., gold, silver, etc.) of transport. Network 300 may signal the LSPs using different signaling protocols in different domains AS1, AS2, where AS2 is split into two tunneling-domains area0 and area1. The tunnel endpoint for each tunnel 42, 44, 46 also acts as a "service endpoint" and may exist in same tunnel domain as the service ingress node, in an adjacent domain, or a non-adjacent domain. An administrator may desire to resolve a service route for a network service over LSPs with certain TE-characteristics across these multiple domains, regardless of the protocol used to signal the LSP in each domain or whether the service endpoint is in same domain or a different domain.

The techniques of the disclosure enable mechanisms for providing a way to model logical "transport-planes" within and across tunneling-domain boundaries; provide a way to do "service-mapping," namely, help service routes 102 and/or transport routes 100 to resolve over a transport plane; and/or provide a way where the cooperating domains AS1, AS2 can coordinate and interoperate between different transport signaling protocols. Examples are described herein with respect to MPLS LSPs as transport-tunnels, but the techniques of the disclosure may be implemented for non-MPLS transport-tunnels also.

The techniques of the disclosure enable the use of BGP-VPN technology to create Transport-VPNs, which keep the tunneling domains loosely coupled while still allowing coordination. In the example service routes 102A-102F (collectively, "service routes 102") of FIG. 3, RD:TunnelEndpoint is the NLRI which handles path-hiding. RT indicates the color of the LSPs, and also handles leaking the transport routes to the corresponding transport RIB of transport RIBs 200A-200B (collectively, "transport RIBs 200") at the other end. Each Transport-tunneling protocol is capable of installing transport routes into a corresponding transport RIB 200 (e.g., <class>.inet.3, such as transport RIB 200A (gold.inet.3), transport RIB 200B (bronze.inet.3)).

In some examples, system 300 models LSP TE-color as a VPN Route-target. In this example, a network device 20, 30 collect the LSPs of the same color in the transport RIB 200 corresponding to the color (e.g., gold, bronze, or uncolored corresponding to transport RIB 200A for gold.inet.3, or transport RIB 200B for bronze.inet.3, or RIB 201 for inet.3, respectively). Network devices 20, 30 advertise service routes 102 and transport routes 100A-100F (collectively, "transport routes 100") in this routing-instance in L3VPN (e.g., inet vpn-uni) AFI-SAFI following RFC-4364 procedures. When crossing an inter-AS link-boundary, the techniques of the disclosure follow Option-B procedures to stitch transport-tunnels 42, 44, 46 in these adjacent domains.

Furthermore, the techniques of the disclosure may be used when crossing intra-AS regions which are different TE-domains. In one example, a user defines "fallback-schemes" that specifies his/her intent on the variety of "resolution-ribs in fallback-order." Network devices 20, 30 can resolve service routes 102 (e.g., service routes) and transport routes 100 (e.g., transport-VPN-routes) over these fallback-schemes by using a new "then fallback-scheme <name>" action specified in the import-policy as described in more detail below.

The techniques of the disclosure may use constructs within the transport layer and the service layer of the OSI Model. The transport layer includes a transport class construct and a fallback-scheme construct. The transport class is a set of TE-characteristics configurable by the user. The transport class automatically creates a transport-RTI and a transport RIB 200 for the color, etc.

The fallback-scheme is an ordered "set of transport classes" defined by a user. The fallback scheme creates an ordered "set of transport RIBs 200," used for resolving PNHs. The order specifies the desired resolution fallback (e.g., a "resolution tree"). The user can define multiple fallback-schemes that specify intent on desired "resolution fallback."

The above transport layer constructs are provisioned on network devices 20, 30, including service nodes and border nodes, before the service layer can use them. This pre-provisioning reduces the risk of Denial-of-Service (DoS) attacks from a misbehaving controller. Performing these fallback resolutions using resolution tree data structures may be CPU-intensive tasks. Therefore, typically, the network should carefully allocate a number of transport classes and fallback schemes that the user is permitted to provision on the network.

The service layer includes a mapping community construct and an import policy. The mapping community construct is an attribute classifying service routes 102 and transport routes 100 to resolve over a transport class 86. An import policy construct maps the mapping community of service routes 102 and transport routes 100 to a particular fallback-scheme.

The above service layer construct maps service routes 102 to the fallback-scheme. An egress network device 20, 30 attaches a mapping community to service routes 102, which inform an ingress network device 20, 30 what primary and fallback transport classes are expected for the service routes 102. The ingress network device 20, 30 maps the received mapping community to a fallback scheme such that the ingress network device 20, 30 chooses a resolution tree that corresponds to the mapping community when creating an Indirect-nexthop (NH). This enables the ingress network device 20, 30 to resolve a service route 102 over a corresponding colored transport layer, and further enables ingress network device 20, 30 to implement event-driven resolution fallbacks. In essence, the new BGP nexthop described herein is extended from "PNH-addr" to "PNH-addr, mapping-community." Network devices 20, 30 may perform additional equal/unequal load-balancing, PIC protection, CoS, etc. using the extended BGP nexthop as a building block.

The example system of FIG. 3 includes three domains. Specifically, the system of FIG. 3 includes two Autonomous-systems AS1 and AS2, where AS2 is split into two tunneling domains area0 and area1. An inter-AS boundary is on a link connecting ASBR23 and ASBR11. Network device 30C is the boundary between the two tunneling domains area0 and area1 within AS2. In the example of FIG. 3, gold.inet.3 and bronze.inet.3, denote transport RIBs 200A-200B, and inet.3 denotes a RIB 201, and are not pushed to the forwarding plane. In contrast, red.inet.0 and inet6.0 are service RIBs which are pushed to forwarding. Bgp.l3vpn.0 is a RIB that contains service routes as well as transport-layer L3VPN routes. In the example of FIG. 3, traffic flow is from network device 20A to network device 20B. The direction of route advertisement is from network device 20A to network device 20B. Network device 20A advertises service routes 102 with community <comm-foo> towards network device 20B. Network device 30A has an underlay tunnel 42 (gold LSP1) to network device 20A, published in transport RIB 200A (gold.inet.3), and an underlay tunnel 44 (bronze-LSP2) to the same destination published in transport RIB 200B (bronze.inet.3).

Being the border node in the "home-domain" of network device 20A, network device 30A originates towards adjacent-domains (network device 30B) L3VPN transport routes 100C, 100D for these "LSPs to network device 20A" comprising of Prefix RD1:1.1.1.1 with RT-gold, and prefix RD2:1.1.1.1 with RT-bronze. These routes are re-advertised further with nexthop-self at subsequent border nodes (e.g., network device 30B, 30C), thus creating mpls.0 transit-routes stitching underlay tunnel 42 (gold LSP1) which the l3vpn-route resolves over. Transport l3vpn-routes with RT-gold map to fallback-scheme "gold" without any fallback, so that the service route for a network service with a "gold" service color does not resolve over any other colored LSP.

Eventually these Transport-L3VPN routes reach network device 20B and are leaked into transport RIB 200A (gold.inet.3) and transport RIB 200B (bronze.inet.3) as 1.1.1.1 (RD is stripped) with next-hop pointing to underlay tunnel 42 (gold LSP1), underlay tunnel 44 (bronze LSP2) respectively, in each domain. Thus at domain boundaries, mpls.0 swap-label stitches the underlay tunnels 42 (gold LSP1) in these domains together, leaking transport routes in transport RIBs 200A (gold.inet.3) on the way at each border node (network devices 30C, 30B, 30A) until the ingress service node (network device 20A). Ingress network device 20B resolves a nexthop for service route 102E in transport RIB 200A (gold.inet.3), which contains "PE11, 1o0, 1.1.1.1" with "nexthop ABR22," resolved via underlay tunnel 42 (gold LSP1). Service route 102E does not resolve over other LSPs because they are not published in transport RIB 200A (gold.inet.3).

Network devices 20, 30 may also choose to apply a fallback scheme to resolve service routes 102 over underlay tunnel 44 (bronze LSP2) or via RIB 201 (global inet.3). The community attached to service routes 102 maps to a fallback scheme identifying the transport RIBs 200B or global RIB 201. Network devices 20, 30 resolve transport routes 100 strictly over the transport class they are part of, without any fallback.

A new AFI/SAFI may be advantageous for operational reasons such that a RIB, transport route pair ("inet, vpn-transport") may be defined. This carries transport endpoints using VPN semantics. Semantically, the RIB, transport route pair is similar to a "RIB, vpn-unicast" pair except that the prefixes carried in the RIB, transport route pair are transport endpoints in a namespace of a service provider (similar to the CsC L3VPN-prefixes in mother-carrier).

With respect to coordinating difference in color route, a border node (e.g., network devices 30A, 30B, 30C) are assumed to know what route-target value is used to represent the service color or transport class (e.g., "gold" or "bronze") in domains AS1, AS2, or any other AS domain the network device 30 is peering with. Network device 30B may apply a per-peer-border node import-policy to match another domain's RT for a transport class and rewrite the other domains RT to an RT for the domain of network device 30B such that the RD:PE11 prefix is leaked into the correct transport RIB 200A (gold.inet.3), even if the two AS domains do not agree on the same RT value for a service color or transport class.

RDs typically do not need to be rewritten. Keeping the originating RD the same helps knowing the actual originator of the service route 102 or transport route 100. VPN-Addpath can help avoid path-hiding at adjacent-domain RR; when the service route 102 or transport route 100 goes through multiple border nodes 30A, 30B, 30C. It is assumed that RD-values are unique across domains, similar to the uniqueness of node-loopbacks. Even if RD-values conflict, VPN-addpath could help disambiguate the transport class or service color as long as the PNH is unique across domains. In other words, a 1o0-address 1.1.1.1 is not configured at two nodes in AS1, AS2 domains as a unicast address.

With respect to failure traffic restoration, BGP-PIC can be used for repair at an ingress node such as network device 20B, similar to the use of LU-PIC. Here, the L3VPN-family transport routes are in the same level as BGP-LU. L3VPN-protection-FRR can be used at border nodes 30A, 30B, 30C to protect against inter-AS link-failure, similar to the use of the BGP-LU-protection feature.

With respect to Import-Policy to add RTs to SRTE routes (where SRTE is used for transport routes 100), the SRTE-family can be considered a VPN-family, similar to inet-vpn. Import-policy can be applied on srte-neighbor to match on color in the NLRI and attach the color-Route-Target before the SRTE route hits VPN route-leaking machinery. This causes the SRTE route to be imported into, e.g., transport route 200A (gold.inet.3) where the color in the NLRI is, e.g., "gold."

The techniques described herein may be applied to L3VPN routes with TEA attribute in lieu of SRTE family (e.g., where L3VPN is used for transport routes 100). In this example, an L3VPN family is used instead of SRTE family to send a RD:PE11 transport route 100 with color-Route-target, and a TEA-attribute with binding-sid and label-stack. This L3VPN route is leaked into transport route 200A (gold.inet.3) with the TEA-attribute binding-sid, where the color is, e.g., "gold." When re-advertising this route in L3VPN, the label-value in binding-sid may be used instead of allocating a dynamic-label.

Resolution fallback may be performed across either Internet Protocol Version 4 (IPv4), Internet Protocol Version (IPv6) RIBs. A PNH is of an IPv4 or IPv6 type. So the PNH may resolve over a set of transport RIBs 200 with the same PNH family. For a transport RIB 200 of <class>.inet[6].3, a transport tunnel 42, 44, 46 publishes itself into both <class>.inet.0 and <class>.inet6.0 using RIB groups for the transport class with which the transport tunnel 42, 44, 46 is configured. A network device 20, 30 may use an IPv4-mapped-IPv6-address to publish IPv4 tunnel endpoints in IPv6 transport RIBs, in a similar fashion to the use of ipv6-tunneling. If the tunnel-endpoint is pure-IPv6, the tunnel endpoint is installed into only the transport RIBs 200 corresponding to <class>.inet6.0. Pure-IPv6 PNH-addresses cannot resolve over IPv4-tunnels. However, if the IPv6 service route 102 carries an IPv4 address as the PNH, the service route 102 may resolve over IPv4 tunnels by virtue of associating the IPv6 service route with the right fallback-scheme.

"Color-only" resolution operates as follows. A controller of a network device 20, 30 programs a 0.0.0.0/32 prefix in transport RIB 200A (gold.inet.3) with the required label-stack. The transport route is propagated across domains similar to other real PNH/32 prefixes. The controller of the network device 20, 30 advertises to an ingress node, e.g., network device 20B, a service prefix set S1, with PNH=0.0.0.0/32. This service prefix is different from the transport routes of other real BGP-peers with real, non-zero PNH addresses. The controller of the network device 20, 30 ensures that the endpoints of the above 0.0.0.0/32 tunnel are all capable of forwarding traffic for all such service prefix sets which the user or SDN controller has advertised with 0.0.0.0/32 as PNH. Otherwise, the network device drops traffic for the corresponding service at tunnel egress. Resolution occurs based on PNH 0.0.0.0/32 as long as the SRTE transport route is usable. When the transport route is not usable, the route is Hidden-Unresolved, and regular BGP routes in, e.g., another transport RIB 200 are be used. Therefore, network devices 20, 30 may perform fallback to real PNHs using real BGP routes.

An example conceptual configuration is set forth below:

```
routing-options transport {
  colors {
    gold {
      route-distinguisher <rd-gold>;
      route-target <rt-gold>;
      mapping community <comm-foo>;
    }
    voice {
      route-distinguisher <rd2>;
      route-target <rt2>;
      mapping community <comm-bar>;
    }
    /* "no-color" is reserved value, for inet[6].3 */
  }
}
protocols mpls label-switched-path <abc> {
  transport-class gold silver;
}
protocols source-packet-routing source-routing-path <def> {
  transport-class gold;
}
```

The foregoing example conceptual configuration has enough user-input to automatically configure the building-blocks and resolve: 1) service routes received with mapping community <comm-foo> over gold transport; and 2) transport routes received with mapping community <rt-gold> over gold transport. This may occur without any fallback. This configuration is at each transport border node and ingress service node of network devices 20, 30.

The techniques disclosed herein also may enable user-defined fallbacks. For example, a network device 20, 30 may receive fallback resolution information that specifies an order of application of one or more underlay tunnels 42, 44, 46 specified by the first transport class. A user may define different resolution fallback mechanisms for different classes of traffic explicitly as follows. The specification fallback resolution information may only be required at ingress service node and border service nodes 20, 30. An egress service node, such as network device 20A, may attach mapping communities such as <comm-gold-voice-nc> to service routes 102.

An example conceptual configuration is set forth below:

```
routing-options transport {
  classes {
    gold-or-voice { /* works for both v4,v6 PNHs */
      resolution-ribs transport-class [gold voice];
    }
    gold-voice-or-nc {
      resolution -ribs transport-class [gold voice no-color];
    }
  }
}
policy-options policy-statement user_defined_import {
  term a {
    from community <comm-gold-voice>; /* picks correct resoln-tree base
      on route's PNH-type[v4/v6]*/
    then fallback-scheme gold-or-voice;
  }
  term b {
    from community <comm-gold-voice-nc>;
    then fallback-scheme gold-voice-or-nc;
  }
}
```

Another example conceptual configuration is set forth below that incorporates all the internal building blocks automatically derived from the above user-input. In this example, a user can also configure the below commands explicitly:

```
routing-instances {
  __gold__ { /* auto-configured instance based on "transport-class gold"*/
    instance-type mpls-forwarding;
    route-distinguisher <rd-gold>;
    vrf-target <rt-gold>;
  }
  __voice__ {
    instance-type mpls-forwarding;
    route-distinguisher <rd2>;
    vrf-target <rt2>;
  }
}
routing-options transport {
  classes {
    __gold__ { /* auto-configured based on transport- class gold
    commands */
      resolution-ribs fallback-scheme gold;
    }
    __voice__ { /* auto-configured based on transport- class voice
    commands */
      resolution-ribs transport- class voice;
```

```
    }
    gold-voice-or-nc { /* user-defined fallback-scheme */
        resolution-ribs transport- class [gold voice no-color];
    }
    red-or-green-v4nh { /* works for v4 PNHs only */
        resolution-ribs red.inet.3 green.inet.3;
    }
    red-or-green-v6nh { /* works for v6 PNHs only */
        resolution-ribs red.inet6.3 green.inet6.3;
    }
  }
}
protocols bgp {
    import __bgp_autocfg_import_po__; /* non-terminal, applied before any
other import-policy */
}
policy-options policy-statement __bgp_autocfg_import_po__{ /* non-terminal
policy */
    term __a1__ {
        from community <rt-gold>;
        then {
            fallback-scheme __gold__;
            next-term;
        }
    }
    term __a2__{
        from community <comm-foo>;
        then {
            fallback-scheme __gold__;
            next-term;
        }
    }
}
policy-options policy-statement user_defined_import {
    term a {
        from community <comm-red-green-v4nh>;
        then fallback-scheme red-or-green-v4nh;
    }
    term b {
        from {
            community <comm-red-green-v4nh>;
        }
        then fallback-scheme red-or-green-v4nh;
    }
    term c {
        from {
            community <red-or-green-v6nh>;
        }
        then fallback-scheme red-or-green-v6nh;
    }
}
protocols mpls label-switched-path <abc> {
    rib-group__lsp_abc__;
}
protocols source-packet-routing source-routing-path <abc> {
    rib-group __spr_abc__;
}
routing-options rib-group {
    __lsp_abc__{
        import-ribs __gold__.inet.3__silver__.inet.3
    }
    __spr_abc__{
        import-ribs __gold__.inet.3
    }
}
```

A system implementing the techniques set forth herein may avoid the use of any new protocol extensions to encode the transport class in the BGP NLRI. The transport class is encoded as VPN RouteTarget. Further, a system as described herein uses RD to avoid path-hiding across RRs, ASBRs. Furthermore, a system as described herein allows for coordination of RT among domains using existing mechanisms that network operators who operate inter-domain VPNs use. Any gaps that exist there can be filled, thus helping all inter-AS VPNs. Furthermore, a system as described herein may use TEA:binding-SID in RFC-8277 NLRI transport routes to carry static-label-value. This may help get static-labels for BGP-LU and L3VPN family and may reduce the configuration overhead at BNs that perform policy configuration-driven static-labels for BGP-LU.

Figure 4:
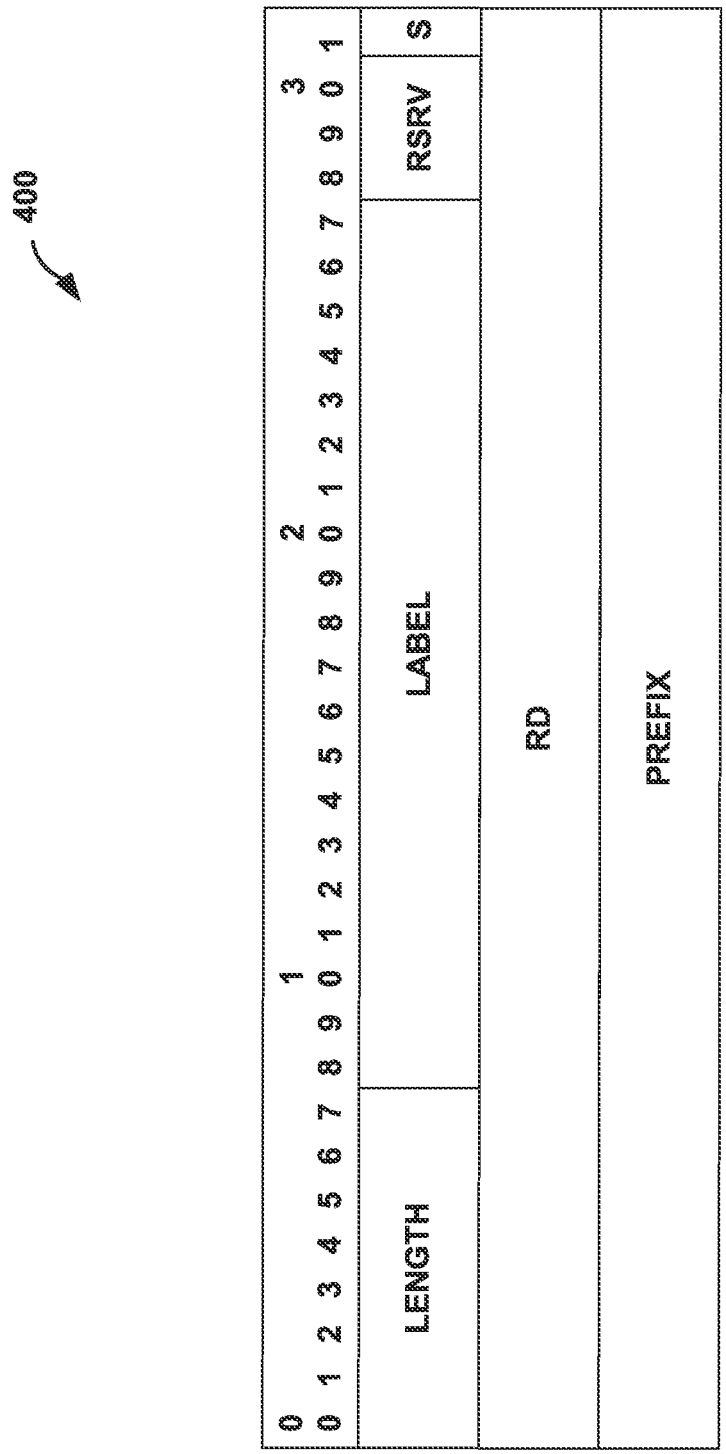
FIG. 4 is a block diagram illustrating an example message for specifying Transport-VPN NLRI in accordance with the techniques of the disclosure.

FIG. 4 is a block diagram illustrating an example message 400 for specifying Transport-VPN NLRI in accordance with the techniques of the disclosure. In some examples, message 400 is an example of routing protocol message 100 of FIG. 1 that comprises a transport route specifying, e.g., the route target and one or more underlay tunnels, that defines a transport class 86 that may be used to resolve service route 102 for a specific network service to one or more underlay tunnels 42, 44, 46. In some examples, routing protocol message 100 is a BGP update message comprising an extended community.

The Transport-VPN family uses existing AFI of IPv4 or IPv6, and a new SAFI "Transport-VPN" that applies to both IPv4 and IPv6. The NLRI encoding is the same as RFC-4364 above (e.g., Address Family Identifiers (AFI)/SAFI=1/128 or 2/128). For example, the new AFI-SAFI identifier specified herein (e.g., the "Transport-VPN"), carries a RD:Transport-Prefix with a transport class RT attribute.

Length. The Length field comprises a single octet. It specifies the length in bits of the remainder of the NLRI field. Note that the length will always be the sum of 20 (number of bits in Label field), plus 3 (number of bits in Rsrv field), plus 1 (number of bits in S field), plus the length in bits of the prefix. In an MP_REACH_NLRI attribute whose SAFI is to be determined, the prefix will be 96 bits or less if the AFI is 1 and will be 192 bits or less if the AFI is 2. As specified in T. Bates et al., "Multiprotocol Extensions for BGP-4," Internet Engineering Task Force (IETF) RFC 4760 (January 2007), the entire content of which is incorporated herein by reference, the actual length of the NLRI field will be the number of bits specified in the Length field, rounded up to the nearest integral number of octets.

Label. The Label field is a 20-bit field containing an MPLS label value. Additional information with respect to MPLS labels is set forth in E. Rosen et al., "MPLS Label Stack Encoding," Internet Engineering Task Force (IETF) RFC 3032 (January 2001), the entire content of which is incorporated herein by reference.

Rsrv. This 3-bit field is set to zero on transmission and is ignored on reception.

S. This 1-bit field is set to one on transmission and is ignored on reception. Attributes on a Transport-VPN route include the Route-Target extended community, which is used to leak the transport route into the right transport RIBs on service nodes and border nodes in the network.

SAFI 128 (InetVpn) is an RFC-8277 encoded family that carries service prefixes in the NLRI, where the prefixes come from the customer namespaces, and are contextualized into separate user virtual service RIBs called virtual routing and forwarding (VRFs), using RFC-4364 procedures.

SAFI 4 (BGP-LU) is an RFC-8277 encoded family that carries transport prefixes in the NLRI, where the prefixes come from the provider namespace.

SAFI 75 (Transport-VPN) is an RFC-8277 encoded family that carries transport prefixes in the NLRI, where the prefixes come from the provider namespace, but are contextualized into separate Transport RIBs, using RFC-4364 procedures.

In some instances, SAFI 128 has been used to carry transport prefixes in "L3VPN Inter-AS Carrier's carrier" scenario, where BGP-LU/LDP prefixes in Carrier Supporting Carrier (CsC) VRF are advertised in SAFI 128 to the remote-end baby carrier.

As described herein, a new AFI/SAFI is used instead of reusing SAFI 128 to carry these transport routes, because it may be operationally advantageous to segregate transport and service prefixes into separate address families and RIBs. For example, the AFI/SAFI described herein allows to safely enable "per-prefix" label allocation scheme for transport-VPN prefixes without affecting SAFI 128 service prefixes which may have huge scale. The "per-prefix" label allocation scheme keeps routing churn local during topology changes. A new family also facilitates having a different re-advertisement path of the transport family routes in a network than the service route re-advertisement path. For example, service routes are exchanged over an external Border Gateway Protocol (EBGP) multi-hop sessions between autonomous systems with an unchanged nexthop; whereas transport-VPN routes are re-advertised over EBGP single hop sessions with "nexthop-self" rewrite over inter-AS links.

The Transport-VPN family is similar in some ways to BGP-LU, in that it carries transport prefixes. In contrast, the Transport-VPN family also carries, in the Route Target, an indication of which transport class the transport prefix belongs to, and uses the route distinguisher to disambiguate multiple instances of the same transport prefix in a BGP Update.

Various nodes configured with the Transport-VPN family extensions may apply the following procedures:

Preparing the network for deploying Transport-VPNs. Operator decides on the transport classes that exist in the network, and allocates a route target to identify each transport class. A user may configure transport classes on the service node and border node network devices in the network with unique Route-Distinguishers and Route-Targets. Implementations may provide automatic generation and assignment of RD, RT values for a transport routing instance; they also may provide a way to manually override the automatic mechanism, in order to deal with any conflicts that may arise with existing RD, RT values in the network.

Origination of Transport-VPN route. At the ingress node of the underlay tunnel's egress domain, the tunneling protocols install routes in the transport RIB associated with the transport class the tunnel belongs to. The ingress node then advertises this transport route into BGP as a Transport-VPN route with NLRI RD:TunnelEndpoint, attaching a Route-Target that identifies the Transport Class.

Alternatively, the egress node of the underlay tunnel (e.g., the tunnel endpoint) may originate the BGP Transport-VPN route, with NLRI RD:TunnelEndpoint and PNH TunnelEndpoint, which will resolve over the transport route at the ingress node. When the tunnel is up, the Transport-VPN route becomes usable and is re-advertised.

Ingress node receiving Transport-VPN route. Upon receiving a BGP Transport-VPN route with a PNH that is not directly connected, e.g. an Internal Border Gateway Protocol (IBGP) route, the Route-Target on the route indicates which transport class this route belongs to. The routes in the associated transport RIB are used to resolve the received PNH. If a route in the transport RIB for the PNH does not exist, the network device considers the transport-VPN route unusable and does not re-advertised the transport-VPN route further.

Border node re-advertising Transport-VPN route with nexthop self. The BN allocates an MPLS label to advertise upstream in Transport-VPN NLRI. The BN also installs an MPLS swap-route for that label that swaps the incoming label with a label received from the downstream BGP speaker, or pops the incoming label. And then pushes received traffic to the transport tunnel or direct interface that the transport-VPN route's PNH resolved over.

Border node receiving Transport-VPN route on EBGP. If the route is received with a PNH that is known to be directly connected, e.g., a EBGP single-hop peering address, the network device checks the directly connected interface for MPLS forwarding capability. No other nexthop resolution process is performed, as the inter-AS link can be used for any transport class.

If the inter-AS links honor transport class, then the BN follows the procedures of an ingress node described above, and performs nexthop resolution process. The interface routes are installed in the transport RIB belonging to the associated transport class.

Avoiding path-hiding through Route Reflectors (RRs). When multiple BNs exist that advertise a RDn:PEn prefix to RRs, the RRs may hide all but one of the BNs, unless [ADDPATH] is used for the Transport-VPN family. This is similar to L3VPN option-B scenarios. Hence [ADDPATH] is used for Transport-VPN family, to avoid path-hiding through RRs.

Ingress node receiving service route with mapping community. A network device resolves service routes received with a mapping community using transport RIBs determined by the resolution scheme. If the resolution process does not find an usable Transport-VPN route or transport route in any of the Transport RIBs, the service route is considered unusable for forwarding purposes.

Coordinating between domains using different community namespaces. Domains may not agree on RT, RD, mapping-community values because of independently administered community namespaces. Such domains may deploy mechanisms to map and rewrite the route target values on domain boundaries, using per-Autonomous System Boundary Router (ASBR) import policies. This is no different than any other BGP VPN family. Mechanisms employed in inter-AS VPN deployments may also be used with the Transport-VPN family.

Though a network device may rewrite an RD on domain boundaries, deploying unique RDs is recommended to help in troubleshooting by uniquely identifying an originator of a transport route and to reduce path-hiding.

This disclosure provides extensions to Internet Assigned Numbers Authority (IANA) implementations to include a new BGP SAFI code for "Transport-VPN." Value 75. This will be used to create new AFI, SAFI pairs for IPv4, IPv6 Transport-Vpn families. For example:

"Inet, Transport-Vpn." AFI/SAFI="1/75" for carrying IPv4 Transport-VPN prefixes.

"Inet6, Transport-Vpn." AFI/SAFI="2/75" for carrying IPv6 Transport-VPN prefixes.

Mechanisms described herein may not have any adverse impact on security of a network.

Additional information with respect to using BGP to distribute transport class information is set forth in K. Vairavakkalai et al., "BGP Transport VPNs draft-kaliraj-idr-bgp-transport-vpn-00," Internet Engineering Task Force (IETF) Internet-Draft (Mar. 7, 2020), available at https://tools.ietf.org/html/draft-kaliraj-idr-bgp-transport-vpn-00, the entire content of which is incorporated herein by reference.

Figure 5:
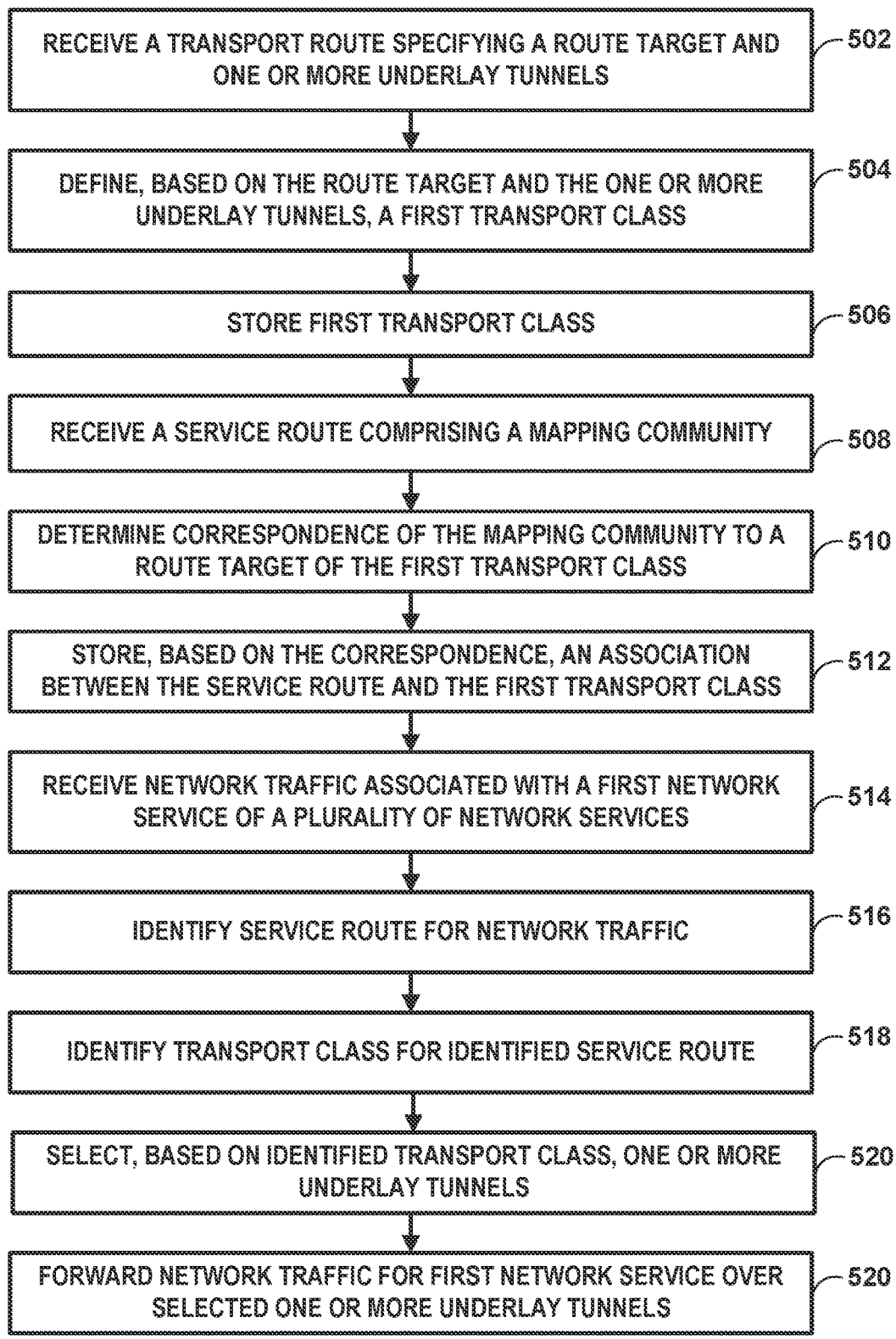
FIG. 5 is a flowchart illustrating an example operation in accordance with the techniques of the disclosure.

FIG. 5 is a flowchart illustrating an example operation in accordance with the techniques of the disclosure. For convenience, FIG. 5 is described with respect to FIGS. 1 and 2. In the example of FIG. 2, network device 50 operates as network device 20 (e.g., an ingress node) of FIG. 1. However, the operation of FIG. 5 may operate in other configurations to implement the techniques of the disclosure, such as network device 30 of FIG. 1.

As depicted in FIG. 5, network device 50 receives a transport route that specifies e.g., a route target, a route distinguisher, and one or more underlay tunnels 42, 44, 46 configured to support service route 102A (502). Service route 102A is configured to transport network traffic associated with a first network service of a plurality of network services. In some examples, network device 50 receives an indication of the route target, the route distinguisher, and the one or more underlay tunnels 42, 44, 46 from a user. In some examples, network device 50 receives the route target, the route distinguisher, and the one or more underlay tunnels 42, 44, 46 as a transport route specified via a routing protocol message.

Network device 50 defines, based on the route target, the route distinguisher, and the one or more underlay tunnels 42, 44, 46, a first transport class 86A of a plurality of transport classes 86 (504). First transport class 86 comprises the route target and the route distinguisher and specifies the one or more underlay tunnels. In some examples, the route target comprises a transport class corresponding to a service color of the first network service. The route target of first transport class 86A is different from route targets of each other transport class 86. The route distinguisher may identify a tunnel endpoint so as to disambiguate multiple instances of the same tunnel endpoint (e.g., service endpoint) IP address, but having different transport classes 86. Network device 50 stores first transport class 86A e.g., in memory 76 (506).

Network device 50 receives, from another network device, e.g., network device 30, service route 102A for the first network service (508). In some examples, service route 102 is extended to specify a mapping community corresponding to the service color of the first network service. Network device 50 determines a correspondence of the mapping community of service route 102A to transport RIB 200A of the first transport class 86A (510).

Network device 50 stores, based on the correspondence of the mapping community of service route 102A to transport RIB 200A of first transport class 86A, an association between service route 102A and first transport class 86A (512). For example, network device 50 installs a transport route for one or more underlay tunnels 42, 44, 46 for service route 102A in first transport RIB 200A, wherein transport RIB 200A corresponds to first transport class 86A.

Subsequently, network device 50 receives network traffic associated with the first network service of the plurality of network services (514). Network device 50 identifies service route 102A as the service route over which the network traffic for the service is to be forwarded (516). For example, network device 50 may determine that a service color specified by the network traffic corresponds to the mapping community specified by service route 102A. Network device 50 identifies, based on the association between service route 102A and transport class 86A, transport class 86A (518). Further, network device 50 selects, based on transport class 86A, one or more underlay tunnels 42, 44, 46 over which to forward the network traffic for the first network service (520).

Network device 50 forwards the network traffic associated with the first network service along the one or more underlay tunnels 42, 44, 46 specified by first transport class 86A (520). For example, network device 50 determines first transport RIB 200A corresponding to first transport class 86A. Network device 50 obtains, from first transport RIB 200A, a PNH for the first network service. Further, network device obtains, from FIB 202, a next hop for the PNH. Network device 50 forwards the network traffic associated with the first network service to the next hop for the PNH.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
storing, by processing circuitry of a network device, data indicative of a first transport class of a plurality of transport classes, wherein the first transport class is a service-specific group associated with a route target and that specifies one or more underlay tunnels of a first administrative domain as belonging to the service-specific group, and wherein the route target associated with the first transport class is different from route targets associated with each other transport class of the plurality of transport classes, wherein the network device comprises a border node at a border of the first administrative domain and a second administrative domain;
storing, by the processing circuitry, an association between a service route and the first transport class to enable stitching together the one or more underlay tunnels of the first administrative domain with one or more underlay tunnels of the second administrative domain that also belong to the service-specific group;
receiving, by the processing circuitry, network traffic associated with a network service via the one or more underlay tunnels of the second administrative domain;
identifying, by the processing circuitry, the network traffic associated with the network service as being associated with the service route; and
forwarding, by the processing circuitry and based on the association between the service route and the first transport class, the network traffic associated with the network service along the one or more underlay tunnels of the first administrative domain specified by the first transport class.

2. The method of claim 1, further comprising:
receiving, by the processing circuitry, the service route, wherein the service route specifies a mapping community;
determining, by the processing circuitry, a correspondence of the mapping community of the service route to a first transport Routing Information Base (RIB) of the first transport class of the plurality of transport classes, the first transport RIB being one of a plurality of transport RIBs, wherein each transport RIB of the plurality of transport RIBs corresponds to a transport class of the plurality of transport classes; and storing, by the processing circuitry and based on the correspondence of the mapping community of the service route to the first transport RIB, the association between the service route and the first transport class of the plurality of transport classes.

3. The method of claim 2, wherein storing, based on the correspondence of the mapping community of the service route to the route target of the first transport class of the plurality of transport classes, the association between the service route and the first transport class of the plurality of transport classes comprises:
installing a transport route for the service route in the first transport RIB, and
wherein forwarding, based on the association between the service route and the first transport class of the plurality of transport classes, the network traffic associated with the network service along the one or more underlay tunnels specified by the first transport class comprises:
forwarding, based on the transport route for the service route specified by the first transport RIB of the plurality of transport RIBs, the network traffic associated with the network service to a protocol next hop (PNH) for the network service.

4. The method of claim 3, wherein forwarding the network traffic associated with the network service to the PNH for the network service comprises:
obtaining, from a forwarding information base (FIB), a next hop for the PNH; and
forwarding the network traffic associated with the network service to the next hop for the PNH.

5. The method of claim 1, wherein the network device comprises a first network device, the method further comprising receiving, by the processing circuitry and via a first routing protocol message from a second network device, data indicating the route target and the one or more underlay tunnels.

6. The method of claim 5, wherein the first routing protocol message comprises a Border Gateway Protocol (BGP) message.

7. The method of claim 5, further comprising in response to receiving the first routing protocol message, outputting, by the processing circuitry and to a network device, a second routing protocol message specifying the route target and the one or more underlay tunnels.

8. The method of claim 5, wherein the first routing protocol message further specifies data indicating a route distinguisher, and
wherein the first transport class comprises the route distinguisher and the route target and specifies the one or more underlay tunnels.

9. The method of claim 5, wherein the first routing protocol message further specifies data indicating a color of the one or more underlay tunnels, and
wherein the first transport class comprises the route target and specifies the one or more underlay tunnels and the color of the one or more underlay tunnels.

10. The method of claim 1, further comprising:
receiving, by the processing circuitry, fallback resolution information specifying an order in which to use the one or more underlay tunnels specified by the first transport class.

11. A network device comprising processing circuitry, the network device configured to:
store data indicative of a first transport class of a plurality of transport classes, wherein the first transport class is a service-specific group associated with a route target and that specifies one or more underlay tunnels of a first administrative domain as belonging to the service-specific group, and wherein the route target associated with the first transport class is different from route targets associated with each other transport class of the plurality of transport classes, wherein the network device comprises a border node at a border of the first administrative domain and a second administrative domain;

store an association between a service route and the first transport class to enable stitching together the one or more underlay tunnels of the first administrative domain with one or more underlay tunnels of the second administrative domain that also belong to the service-specific group;

receive network traffic associated with a network service via one or more underlay tunnels of the second administrative domain;

identify the network traffic associated with the network service as being associated with the service route; and forward, based on the association between the service route and the first transport class, the network traffic associated with the network service along the one or more underlay tunnels of the first administrative domain specified by the first transport class.

12. The network device of claim 11, wherein the network device comprises a first network device and is further configured to:

receive, from a second network device, the service route, wherein the service route specifies a mapping community;

determine a correspondence of the mapping community of the service route to a first transport Routing Information Base (RIB) of the first transport class of the plurality of transport classes, the first transport RIB being one of a plurality of transport RIBs, wherein each transport RIB of the plurality of transport RIBs corresponds to a transport class of the plurality of transport classes; and store, based on the correspondence of the mapping community of the service route to the first transport RIB, the association between the service route and the first transport class of the plurality of transport classes.

13. The network device of claim 12, wherein to store, based on the correspondence of the mapping community of the service route to the route target of the first transport class of the plurality of transport classes, the association between the service route and the first transport class of the plurality of transport classes, the network device is configured to:

install a transport route for the service route in the first transport RIB, and wherein to forward, based on the association between the service route and the first transport class of the plurality of transport classes, the network traffic associated with the network service along the one or more underlay tunnels specified by the first transport class, the network device is configured to:

forward, based on the transport route for the service route specified by the first transport RIB of the plurality of transport RIBs, the network traffic associated with the network service to a protocol next hop (PNH) for the network service.

14. The network device of claim 13, wherein to forward the network traffic associated with the network service to the PNH for the network service, the network device is configured to:

obtain, from a forwarding information base (FIB), a next hop for the PNH; and forward the network traffic associated with the network service to the next hop for the PNH.

15. The network device of claim 11, wherein the network device comprises a first network device, and wherein the first network device is configured to receive, via a routing protocol message from a second network device, data indicating the route target and the one or more underlay tunnels.

16. The network device of claim 15, wherein the routing protocol message further specifies data indicating a route distinguisher, and wherein the first transport class comprises the route distinguisher and the route target and specifies the one or more underlay tunnels.

17. The network device of claim 15, wherein the routing protocol message further specifies data indicating a color of the one or more underlay tunnels, and wherein the first transport class comprises the route target and specifies the one or more underlay tunnels and the color of the one or more underlay tunnels.

18. Non-transitory computer-readable storage media comprising encoded instructions for causing processing circuitry of a network device to:

store data indicative of a first transport class of a plurality of transport classes, wherein the first transport class is a service-specific group associated with a route target and that specifies one or more underlay tunnels of a first administrative domain as belonging to the service-specific group, and wherein the route target associated with the first transport class is different from route targets associated with each other transport class of the plurality of transport classes, wherein the network device comprises a border node at a border of the first administrative domain and a second administrative domain;

store an association between a service route and the first transport class to enable stitching together the one or more underlay tunnels of the first administrative domain with one or more underlay tunnels of the second administrative domain that also belong to the service-specific group;

receive network traffic associated with a network service via one or more underlay tunnels of the second administrative domain;

identify the network traffic associated with the network service as being associated with the service route; and forward, based on the association between the service route and the first transport class, the network traffic associated with the network service along the one or more underlay tunnels of the first administrative domain specified by the first transport class.

19. The non-transitory computer-readable storage media of claim 18, wherein the processing circuitry is further configured to:

receive, from another network device, the service route, wherein the service route specifies a mapping community;

determine a correspondence of the mapping community of the service route to a first transport Routing Information Base (RIB) of the first transport class of the plurality of transport classes, the first transport RIB being one of a plurality of transport RIBs, wherein each transport RIB of the plurality of transport RIBs corresponds to a transport class of the plurality of transport classes; and store, based on the correspondence of the mapping community of the service route to the first transport RIB, the association between the service route and the first transport class of the plurality of transport classes.

20. The non-transitory computer-readable storage media of claim 19,
wherein to store, based on the correspondence of the mapping community of the service route to the route target of the first transport class of the plurality of transport classes, the association between the service route and the first transport class of the plurality of transport classes, the processing circuitry is configured to:
install a transport route for the service route in the first transport RIB, and
wherein to forward, based on the association between the service route and the first transport class of the plurality of transport classes, the network traffic associated with the network service along the one or more underlay tunnels specified by the first transport class, the processing circuitry is configured to:
forward, based on the transport route for the service route specified by the first transport RIB of the plurality of transport RIBs, the network traffic associated with the network service to a protocol next hop (PNH) for the network service.

* * * * *